(12) United States Patent  
Tanzawa et al.

(10) Patent No.: US 9,149,716 B2  
(45) Date of Patent: Oct. 6, 2015

(54) GAME APPARATUS AND GAME PROGRAM

(71) Applicant: KABUSHIKI KAISHA SQUARE ENIX, Tokyo (JP)

(72) Inventors: Yuuichi Tanzawa, Shinjuku-ku (JP); Daisuke Miyata, Chiyoda-ku (HK); Yoshimasa Asao, Chiyoda-ku (JP); Tetsuro Uchida, Chiyoda-ku (JP); Masako Odaira, Chiyoda-ku (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 222 days.

(21) Appl. No.: 13/753,938

(22) Filed: Jan. 30, 2013

(65) Prior Publication Data

US 2013/0331182 A1  Dec. 12, 2013

(30) Foreign Application Priority Data

Jun. 11, 2012  (JP) ................................ 2012-132396

(51) Int. Cl.
```
A63F 13/06        (2006.01)
A63F 13/20        (2014.01)
A63F 13/40        (2014.01)
A63F 13/426       (2014.01)
A63F 13/2145      (2014.01)
A63F 13/56        (2014.01)
```
(52) U.S. Cl.
CPC ................. *A63F 13/06* (2013.01); *A63F 13/10* (2013.01); *A63F 13/2145* (2014.09); *A63F 13/426* (2014.09); *A63F 13/56* (2014.09)

(58) Field of Classification Search
USPC ......................................... 463/40–43, 30–31
See application file for complete search history.

(56) References Cited

U.S. PATENT DOCUMENTS

| | | | |
|---|---|---|---|
| 6,508,708 B1 | 1/2003 | Okubo | |
| 2006/0003824 A1* | 1/2006 | Kobayashi et al. | 463/1 |
| 2006/0003843 A1* | 1/2006 | Kobayashi et al. | 463/43 |
| 2008/0146328 A1* | 6/2008 | Ishii et al. | 463/31 |

FOREIGN PATENT DOCUMENTS

JP  2010-115498  5/2010

OTHER PUBLICATIONS

U.S. Appl. No. 13/633,401 to Yuuichi Tanzawa et al., filed Oct. 2, 2012.
U.S. Appl. No. 13/748,937 to Yuuichi Tanzawa et al., filed Jan. 24, 2013.

* cited by examiner

*Primary Examiner* — Jay Liddle  
*Assistant Examiner* — Alex F. R. P. Rada, II  
(74) *Attorney, Agent, or Firm* — Greenblum & Bernstein, P.L.C.

(57) ABSTRACT

A task of the present invention is to prevent timings of a plurality of objects to arrive at the same destination from becoming uncoordinated and perform efficient computation processing to perform control of moving a plurality of objects in game space to the same destination. A movement control unit of the present invention reads information related to a moving speed of each player object from an object memory unit to perform control of moving a plurality of plurality objects. Further, the movement control unit determines a party moving speed for moving a plurality of player objects as a party based on the read information related to the plurality of moving speeds. Furthermore, the movement control unit performs control of moving a plurality of player objects according to the party moving speed.

9 Claims, 11 Drawing Sheets

OBJECT TABLE

| PLAYER OBJECT | No. | MOTION DATA | MOVING SPEED | INFLUENCE FORCE | ATTACK FORCE | DEFENSE FORCE | .... |
|---|---|---|---|---|---|---|---|
| PLAYER OBJECT1 | 1567 | motion1.vmd | 250 | 160 | 200 | 180 | .... |
| PLAYER OBJECT2 | 1568 | motion2.vmd | 80 | 250 | 400 | 350 | .... |
| PLAYER OBJECT3 | 1569 | motion3.vmd | 150 | 300 | 320 | 150 | .... |
| ........ | .... | ........ | ... | ... | ... | ... | .... |

Fig.5
(a)
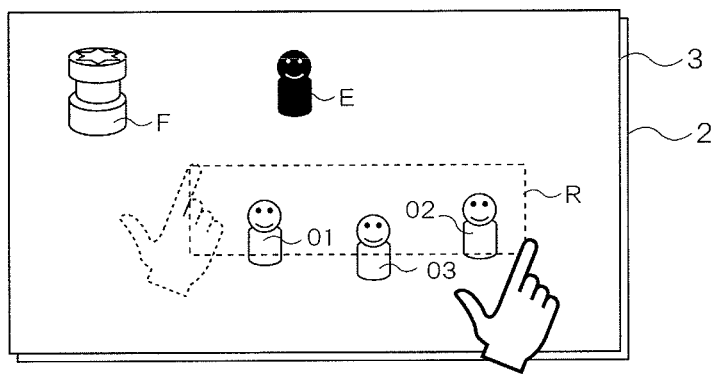
(b)
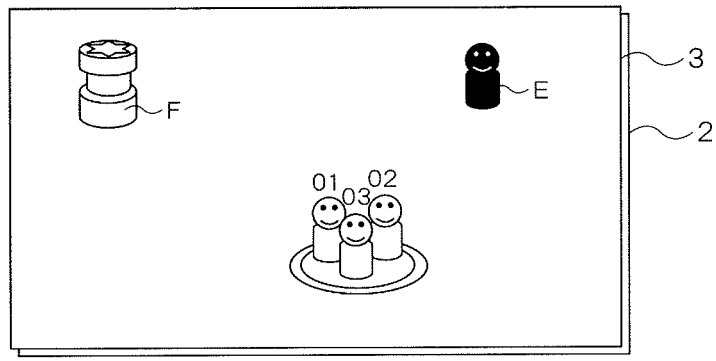
(c)
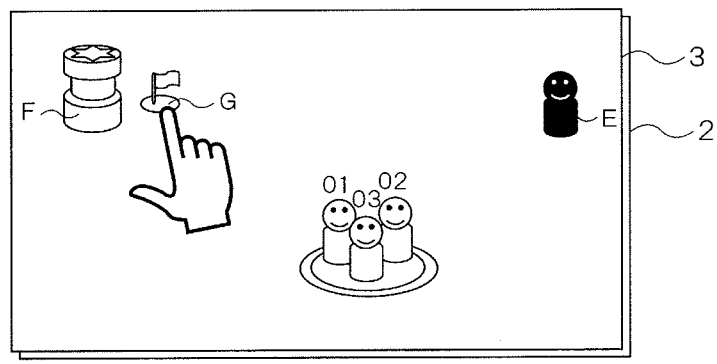
(d)
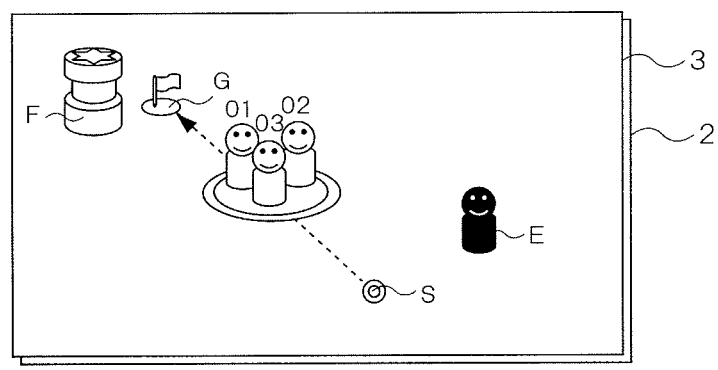

Fig.12
(a)
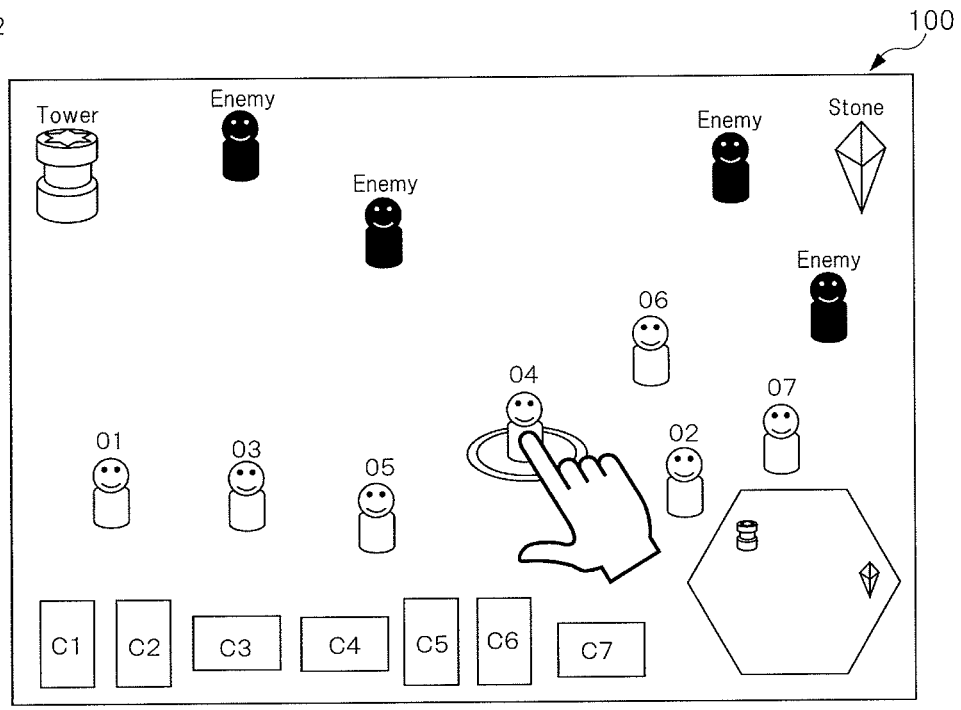
(b)
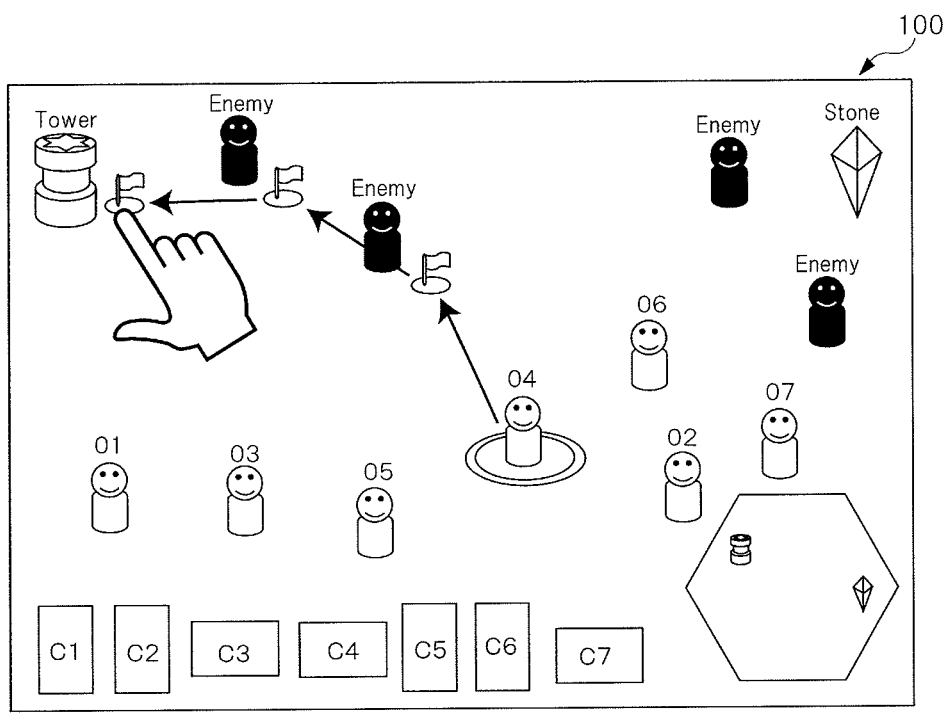

Fig.13
(a)
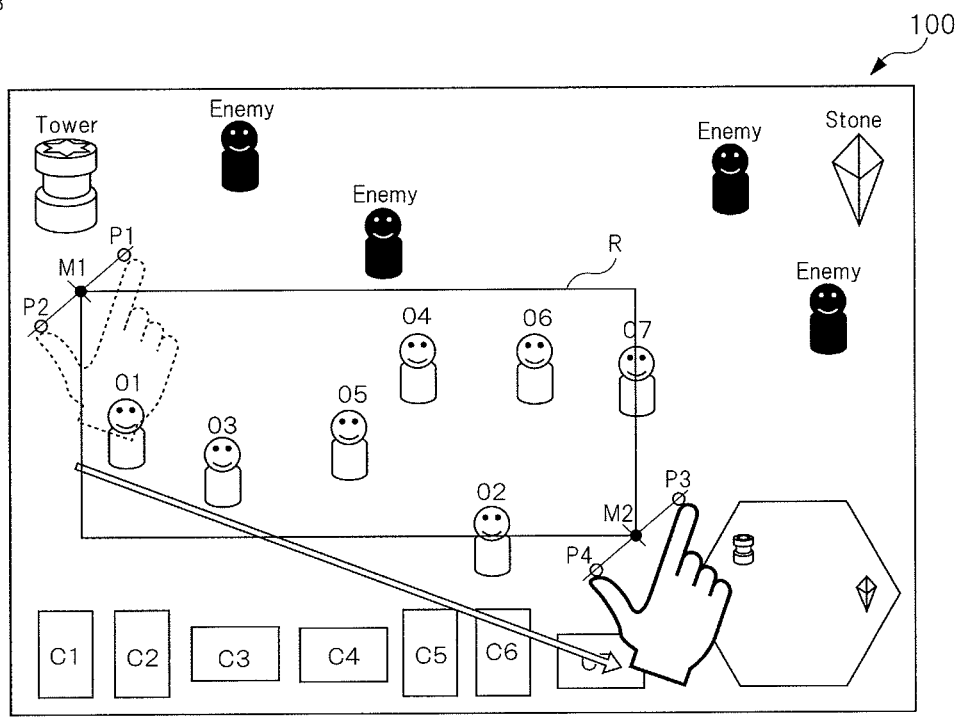
(b)
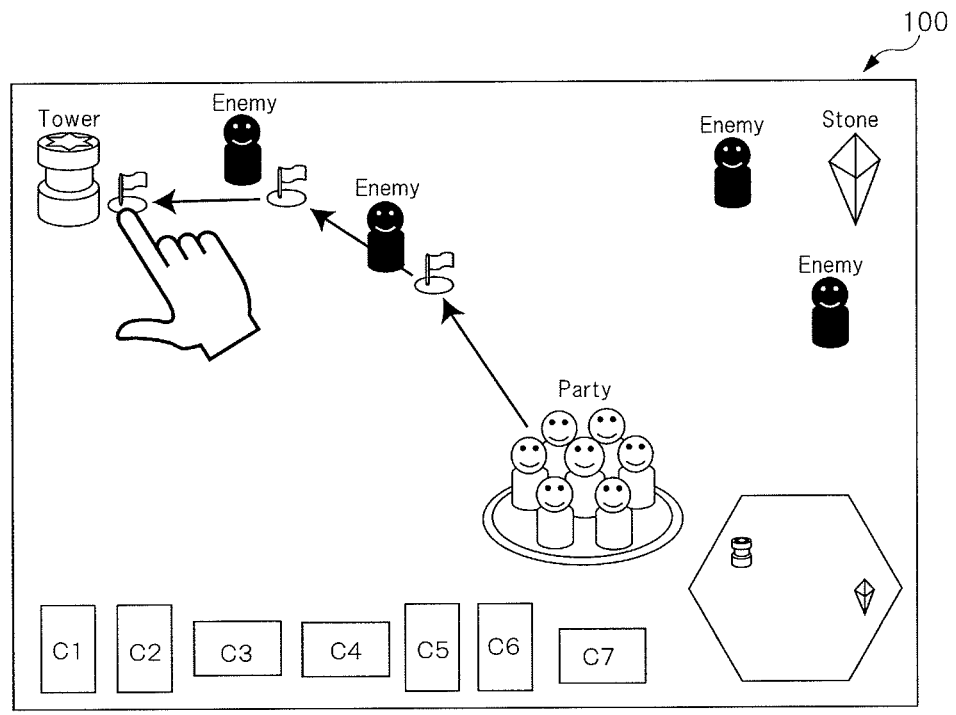

GAME APPARATUS AND GAME PROGRAM

TECHNICAL FIELD

The present invention relates to a game apparatus and a game program which advance a game by controlling movement of an object displayed on a screen.

BACKGROUND ART

Conventionally, a game apparatus and a program of selecting one or a plurality of objects displayed on a screen using a pointing device such as a touch screen and a mouse pointer and controlling movement of the selected objects are well known. For example, the game apparatus executes game processing of playing a match with, for example, an enemy object during movement or at an arrival point after the movement by moving one or a plurality of objects.

Further, a technique of selecting a plurality of player objects and simultaneously controlling movement of a plurality of selected player objects is known as a technique disclosed in, for example, Patent Literature 1. According to the technique disclosed in Patent Literature 1, a circular area inputted through a touch panel is recognized, and a plurality of player objects included in this circular area is selected. Further, a plurality of selected player objects is moved toward a touch position (destination) inputted through the touch panel. In this case, there are individual differences between moving speeds of player objects, and some player objects arrive at the destination soon and some player objects do not arrive at the destination so soon.

CITATION LIST

Patent Literature

Patent Literature 1: JP 2010-115498 A

SUMMARY OF INVENTION

Technical Problem

However, like the technique disclosed in the above Patent Literature 1, when each player object is moved according to each moving speed to move a plurality of player objects to the same destination, timings when the player objects arrive at the destination become uncoordinated. Particularly when game space in which player objects exist is vast and distances from movement start positions to a destination are long, a difference between arrival times between a player object which arrives at the destination first and a player object which arrives the destination last becomes significant. When, for example, a user makes a plan of having a plurality of player objects launch a concerted attack against a given enemy object, if timings when the player objects arrive at an enemy object of an attack target become uncoordinated, the concerted attack cannot be launched by a plurality of player objects. Therefore, the conventional technique cannot accurately reflect a user's intention in game processing, and lacks operability and excitement of a game.

Further, like the technique disclosed in the above Patent Literature 1, when movement of a plurality of player objects is controlled according to individual moving speeds, it is necessary to compute, for example, arrival times of all player objects to arrive at a destination. In view of above, there is a problem that the amount of computation processing for moving a plurality of player objects increases, and an entire game processing speed decreases. Particularly, according to the technique disclosed in the above Patent Literature 1, it is necessary to perform computation processing individually for all player objects movement of which is controlled, and, when the number of player objects to be simultaneously moved increases, the amount of computation processing proportionately increases.

Therefore, currently, a game apparatus and a game program are demanded which, to perform control of moving a plurality of objects in game space to the same destination, can prevent timings to arrive at the destination from becoming uncoordinated and perform efficient computation processing.

Solution to Problem

Hence, the inventors of the present invention obtained knowledge as a result of devoted study of means for solving the above problem of the conventional invention that, by calculating one party moving speed based on individual moving speeds and controlling movement of a plurality of selected player objects according to the calculated party moving speed to control movement of a plurality of selected player objects while the moving speeds are individually set to the player objects in game space, it is possible to coordinate timings when all player objects arrive at a destination. Further, the inventors obtained knowledge that it is possible to realize efficient computation processing of controlling movement of a plurality of player objects by performing this movement control. Furthermore, the inventors of the present invention arrived at solving the problem of the conventional technique based on the above knowledge, and made the present invention.

More specifically, the present invention employs the following configuration.

A first aspect of the present invention relates to a game apparatus.

The game apparatus according to the present invention has an object memory unit 1, a display unit 2, a coordinate input unit 3, an object selecting unit 4 and a movement control unit 5.

The object memory unit 1 stores information related to moving speeds at which a plurality of player objects in game space moves in the game space.

The display unit 2 can display images of the plurality of player objects (including movies and still images).

The coordinate input unit 3 receives an input of a coordinate of the display unit 2 on a display screen.

The object selecting unit 4 selects one or the plurality of player objects among the player objects displayed on the display unit 2 based on the coordinate inputted to the coordinate input unit 3.

The movement control unit 5 performs control of moving the one or the plurality of player objects selected by the object selecting unit 4 in the game space.

Meanwhile, when the object selecting unit 4 selects one player object, the movement control unit 5 reads information related to a moving speed of the one selected player object from the object memory unit 1, and performs control of moving the one selected player object based on the information related to the read moving speed.

When the object selecting unit 4 selects the plurality of player objects on the other hand, the movement control unit 5 reads the information related to the moving speeds of the plurality of selected player objects from the object memory unit 1, determines a party moving speed for moving the plurality of selected player objects as a party based on the read information related to the plurality of moving speeds, and performs control of moving the plurality of selected player objects according to the party moving speed.

As in the above configuration, to control movement of a plurality of player objects, the movement control unit 5 of the game apparatus according to the present invention calculates one party moving speed from the moving speed of each player object, and perform control of moving all player objects according to this party moving speed instead of moving each player object according to an individual moving speed. That is, a plurality of player objects moves at a constant velocity (party moving speed) in the game space. By this means, when, for example, a plurality of player objects is moved to a given destination in the game space, it is possible to coordinate timings when each player object arrives at the destination. Further, movement of each player object only needs to be controlled according to one party moving speed, so that the amount of computation processing decreases compared to the amount of computation processing of moving each player object according to an individual moving speed, and it is possible to make processing efficient.

In the present invention, the object memory unit 1 preferably stores the information related to the moving speed of the player object as information which enables superiority and inferiority of a moving speed of each player object to be decided. The "information which enables superiority and inferiority of a moving speed of each player object to be decided" is indicated by, for example, a numerical value of the moving speed of each player object, and is set based on the rank of superiority and inferiority of the moving speed of each player object.

In this case, the movement control unit 5 may determine the party moving speed as a most inferior moving speed among the information related to the plurality of moving speeds read from the object memory unit 1.

As in the above configuration, when the party moving speed is determined as the slowest moving speed among moving speeds of a plurality of selected player objects, it is possible to clarify a merit and a demerit of moving each player object as a single object and a merit and a demerit of moving each player object as a party. When, for example, the player object is moved as a single object, while there is a merit that the player object arrives at the destination relatively early, there is a demerit that a plurality of player objects can hardly launch a concerted attack. On the other hand, when a plurality of player objects is moved as a party, while there is a demerit that times to arrive at the destination are delayed, there is a merit that a plurality of player objects can easily launch a concerted attack. By this means, the dimension of the game provided by the game apparatus improves. Further, the party moving speed is set as the slowest moving speed among the moving speeds of a plurality of selected player objects and, consequently, is easily determined.

In the present invention, the object memory unit 1 preferably stores the information related to the moving speed of the player object as a numerical value.

In this case, the movement control unit 5 may calculate an average value from numerical values of the plurality of moving speeds read from the object memory unit 1, and determine the calculated average value as the party moving speed.

As in the above configuration, by storing the information related to the moving speeds of the player objects as numerical values, it is possible to calculate the average value of moving speed values of the player objects. The average value of the moving speed values may be the party moving speed.

The object memory unit 1 may further store values of influence forces of the player objects.

In this case, when the object selecting unit 4 selects a plurality of player objects, the movement control unit 5 reads information related to the moving speeds of a plurality of selected player objects and the values of the influence forces, from the object memory unit 1. Further, the movement control unit 5 determines information related to a moving speed of a player object which has a highest influence force among the plurality of read influence forces as a party moving speed, and performs control of moving the plurality of selected player objects according to the party moving speed.

As described above, the value of the influence force associated with each player object influences on determination of the party moving speed. As in the above configuration, by associating the value of the influence force with each player object, it is possible to improve a strategic level of a game played by moving each player object and improve excitement of the game.

In the present invention, the game apparatus preferably further has an area specifying unit 6 which specifies an area R on the display screen of the display unit 2 based on the coordinate inputted to the coordinate input unit 3.

This area specifying unit 6 determines a coordinate of a first intermediate point M1 calculated from coordinates of first two points based on the coordinates of the first two points simultaneously inputted to the coordinate input unit 3, and determines a coordinate of a second intermediate point M2 calculated from coordinates of last two points based on the coordinates of the last two points detected immediately before the coordinates of the two points stop being simultaneously inputted.

Further, the area specifying unit 6 defines the area R on the display screen of the display unit 2 based on the coordinate of the first intermediate point M1 and the coordinate of the second intermediate point M2.

Furthermore, the object selecting unit 4 selects the one or the plurality of player objects at least part of which is included in the area R specified by the area specifying unit 6.

According to the preferred embodiment of the present invention, as in the above configuration, by calculating a first intermediate coordinate of one point from the coordinates of the two points simultaneously inputted first and a second intermediate coordinate from the coordinates of the two points simultaneously inputted last, the area on the display screen is defined based on the first intermediate coordinate and the second intermediate coordinate. Thus, according to the preferred embodiment of the present invention, the present invention requires that the inputting operation of specifying the area on the display screen is an operation of simultaneously inputting coordinates of two points to the coordinate input unit 3. Consequently, it is possible to prevent a user's error operation by effectively distinguishing an inputting operation of specifying an area on a display screen from, for example, a touching or click inputting operation of specifying one point and an operation of sliding an input of one point while continuing inputting the point. Further, according to the preferred embodiment of the present invention, when, for example, a touch panel display is assumed, it is possible to obtain the first intermediate coordinate from touch positions of two fingers, obtain a second intermediate coordinate from touch positions released after the two fingers slide, and define the area on the display screen based on these first intermediate coordinate and second intermediate coordinate. Consequently, according to the preferred embodiment of the present invention, the user can easily specify a wide range of an area on the display screen by one hand.

A second aspect of the present invention is a game program which causes a computer to function as the object memory unit 1, the display unit 2, the coordinate input unit 3, the object selecting unit 4 and the movement control unit 5.

A third aspect of the present invention relates to a game apparatus which has a touch panel display and a card reader.

The game apparatus according to third aspect has: a touch panel display 100; a card reader 200; and a game body 300 which advances a game by displaying information read by the card reader 200 and displaying the information on the touch panel display 100.

The touch panel display 100 has: a display 110 which can display an image; and a touch screen 120 which is overlaid in front of the display 110 and through which a coordinate on a display screen is inputted.

The card reader 200 has: a panel 210 on which a card with a code having predetermined card information printed thereon is set; and an image sensor 230 which reads the code of the card set on the panel 210 and detects the card information.

Further, the game body 300 has: a game information memory unit 380 which stores information related to the player objects in association with the card information, and stores information related to moving speeds at which the plurality of player objects moves in the game space; an image processing unit 330 which reads the information related to the player objects from the game information memory unit 380 based on the card information detected by the image sensor 230 of the card reader 200, and performs control of displaying the images of the read player objects on the display 110 of the touch panel display 100; and a game processing unit 320.

Meanwhile, the game processing unit 320 selects one or a plurality of player objects among a plurality of player objects displayed on the display 110 based on the coordinate information inputted to the touch screen 120.

In this case, when selecting the one player object, the game processing unit 320 reads the information related to the moving speed of the one selected player object from the game information memory unit 380, and performs control of moving the one selected player object based on the read information related to the moving speed.

When selecting the plurality of player objects on the other hand, the game processing unit 320 reads the information related to the moving speeds of the plurality of selected player objects from the game information memory unit 380, determines a party moving speed for moving the plurality of selected player objects as a party based on the read information related to the plurality of moving speeds, and performs control of moving the plurality of selected player objects according to the party moving speed.

In view of the above configuration, the game apparatus according to the third aspect of the present invention has the touch panel display 100 and the card reader 200 mounted thereon, and advances a game by combining these operations. This game apparatus can create one or a plurality of player objects in the game space according to the number of cards set on the card reader 200. For example, a user of the game is required to incessantly perform operations of, for example, operating by one hand a card set on the card reader to display one or a plurality of objects on the touch panel display, and performing touch control of the touch panel display by the other hand to select the displayed object. In this regard, to control movement of a plurality of player objects, the present invention calculates one party moving speed from the individual moving speed of each player object, and controls movement of all player objects according to this party moving speed, so that it is possible to easily perform an operation of moving a plurality of player objects even in the game apparatus which requires incessant operations.

Advantageous Effects of Invention

To control movement of a plurality of player objects, the game apparatus according to the present invention calculates one party moving speed from the moving speed of each player object, and performs control of moving all player objects according to this party moving speed instead of moving each player object according to the individual moving speed. That is, a plurality of player objects moves at a constant velocity (party moving speed) in the game space. By this means, when, for example, a plurality of player objects is moved to a given destination in the game space, it is possible to coordinate timings when each player object arrives at the destination.

Further, movement of each player object only needs to be controlled according to one party moving speed, so that the amount of computation processing decreases compared to the amount of computation processing of moving each player object according to an individual moving speed, and it is possible to make processing efficient.

BRIEF DESCRIPTION OF DRAWINGS

FIGS. 5(a) to 5(d) are schematic views illustrating examples of control of moving a plurality of player objects as a party.

FIGS. 12(a) and 12(b) are views for describing examples of a game executed by the game apparatus according to the present invention.

FIGS. 13(a) and 13(b) are views for describing examples of a game executed by the game apparatus according to the present invention.

DESCRIPTION OF EMBODIMENTS

An embodiment for implementing the present invention will be described below with reference to the drawings. The present invention is by no means limited to the embodiment described below, and incorporates embodiments obtained by adequately modifying the following embodiment in a range obvious for one of ordinary skill in art.

(1. Basic Configuration of Game Apparatus)

First, a basic configuration of a game apparatus according to the present invention will be described.

The game apparatus according to the present invention basically advances a game by controlling movement of a plurality of objects on a display screen. Objects include, for example, player objects which can move in game space according to a user's operation, non-player objects which move in the game space irrespectively of a given user's operation and fixed objects which do not move in the game space. Further, in, for example, a match game, there are also enemy player objects which move in the game space according to another user's operation. The game apparatus recognizes that one or a plurality of player objects on the display screen is selected by a pointing device such as a mouse pointer or a touch screen, and controls movement of the selected player objects. Further, the game apparatus basically repeats controlling movement of player objects, and advances a game according to a movement control result.

Figures 1, 2:
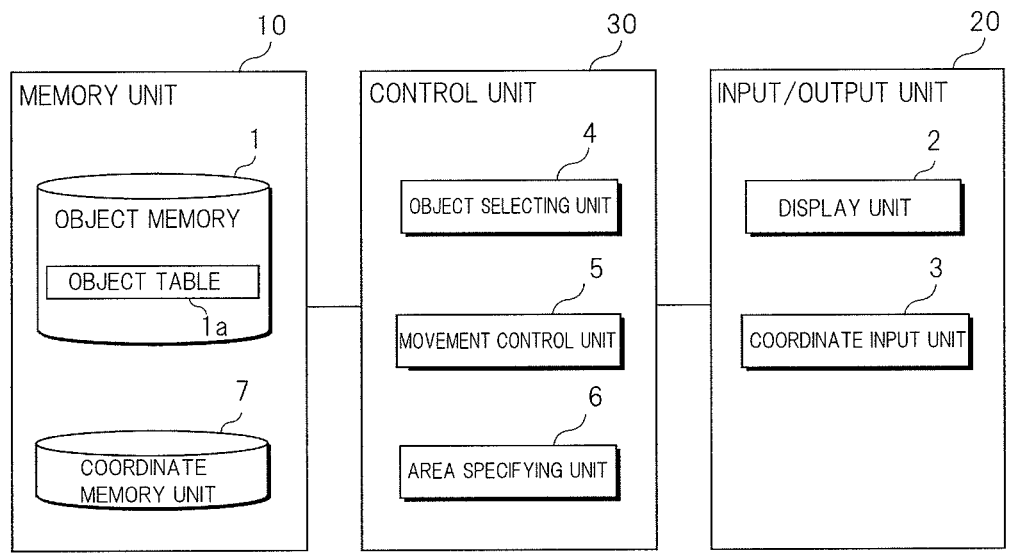
FIG. 1 is a functional block diagram illustrating a game apparatus according to the present invention.
FIG. 2 illustrates an example of an object table.

FIG. 1 is a block diagram illustrating a basic functional configuration of the game apparatus according to an embodiment of the present invention. The game apparatus is configured using a computer and has a memory unit 10, an input/output unit 20 and a control unit 30 as illustrated in FIG. 1, and these components are connected to each other through, for example, a bus to transmit and receive information. That is, when receiving an input of predetermined information from the input/output unit 20, the control unit 30 reads a control program stored in a main memory of the memory unit 10. Further, the control unit 30 adequately reads data stored in the memory unit 10 according to a command of the control program, and performs predetermined computation. Furthermore, the computation result is temporarily stored in the memory unit 10, and is outputted from the input/output unit 20.

The memory unit 10 stores various pieces of information including the control program required for processing in the game apparatus according to the present invention. The memory unit 10 is realized by a storage apparatus such as a ROM (Read Only Memory) or a RAM (Random Access Memory). The RAM is, for example, a VRAM (Video RAM), a DRAM (Dynamic RAM) or a SRAM (Static RAM). Part of a memory area of the memory unit 10 functions as the object memory unit 1 and the coordinate memory unit 7.

The object memory unit 1 stores information including image data (for example, a top coordinate, a top texture coordinate or brightness data of the object) of various objects displayed on the display unit 2. More specifically, the object memory unit 1 stores data of an object table 1a. FIG. 2 illustrates an example of the object table 1a. As illustrated in FIG. 2, in, for example, the object table 1a, information including, for example, an identification number (No.) of each player object, motion data for displaying a player object on the display unit 2, a numerical value of a moving speed used to control an operation of each player object, a numerical value of an influence force, a numerical value of an attack force and a numerical value of a defense force is associated and stored. Not only information to be associated and stored in the object table 1a is not limited to these pieces of information, but also information unique to various types of other objects can be stored.

The coordinate memory unit 7 stores coordinate information acquired by the coordinate input unit 3 described below. The coordinate memory unit 7 stores coordinate information read and written by the control unit 30, and is realized by, for example, a working area of the RAM.

The input/output unit 20 includes the display unit 2 and the coordinate input unit 3. The display unit 2 is a display apparatus such as a LCD (Liquid Crystal Display) or an OELD (Organic Electro Luminescence Display). The display unit 2 outputs and displays various pieces of information which the user requires to use the information processing apparatus, as a still image or a movie according to an input signal from the control unit 30. Further, the coordinate input unit 3 is a pointing device such as a mouse pointer or a touch screen. The user can specify an arbitrary position on a screen displayed on the display unit 2 through the coordinate input unit 3 as coordinate information.

Further, as to the display unit 2 and the coordinate input unit 3, the touch panel display is preferably formed by disposing the coordinate input unit 3 formed using a transparent material, in front of the display unit 2. The touch panel display is configured to display various items of image data as an image which a user can view, and detect a coordinate which the user touched on a display screen. More specifically, the touch panel display can detect contact of the user's hand or finger according to a known electrostatic capacitance method, electromagnetic induction method, infrared scan method, resistance film method or ultrasonic surface acoustic wave method, and obtain coordinate information. Upon formation of the touch panel display, a positional relationship between the display unit 2 and the coordinate input unit 3 is mutually linked, and the coordinate input unit 3 can obtain coordinate information about a touch position on a display screen displayed on the display unit 2. By this means, the coordinate input unit 3 can detect contact of the user's finger, and obtain the information about the coordinate on the screen of the display unit 2 which the user's finger contacted. Further, the coordinate input unit 3 preferably supports so-called multi-touch of, when, for example, the user touches a plurality of points, acquiring information about coordinates of a plurality of these points.

The control unit 30 controls the entire operation of the game apparatus by reading and executing the control program stored in the memory unit 10. The control unit 30 realizes a function by means of, for example, a CPU (Central Processing Unit) or a GPU (Graphics Processing Unit). The control unit 30 reads information including image data such as motion data of various objects from the object memory unit 1, generates an image of the object and has the display unit 2 display the image. Further, the control unit 30 stores coordinate information detected by the coordinate input unit 3, in the coordinate memory unit 7. Particularly, the control unit 30 can decide whether or not a player object is selected by a user by analyzing position information of the player object displayed on the display unit 2 and the coordinate information inputted to the coordinate input unit 3, and control movement of the selected player object in the game space.

As illustrated in FIG. 1, the control unit 30 has an object selecting unit 4, a movement control unit 5 and an area specifying unit 6 from the functional view point. The object selecting unit 4 has a function of detecting the coordinate inputted to the coordinate input unit 3 and, when the player object displayed on the display unit 2 is included in the detected coordinate position or a predetermined area, selecting one or a plurality of player objects. Further, the movement control unit 5 can control movement of the player object selected by the object selecting unit 4 according to the control program stored in the memory unit 10. Furthermore, the area specifying unit 6 has a function of specifying an arbitrary area on the display screen of the display unit 2 according to the information inputted to the coordinate input unit 3. Processing executed by the control unit 30 including these components will be described below.

Figure 3:
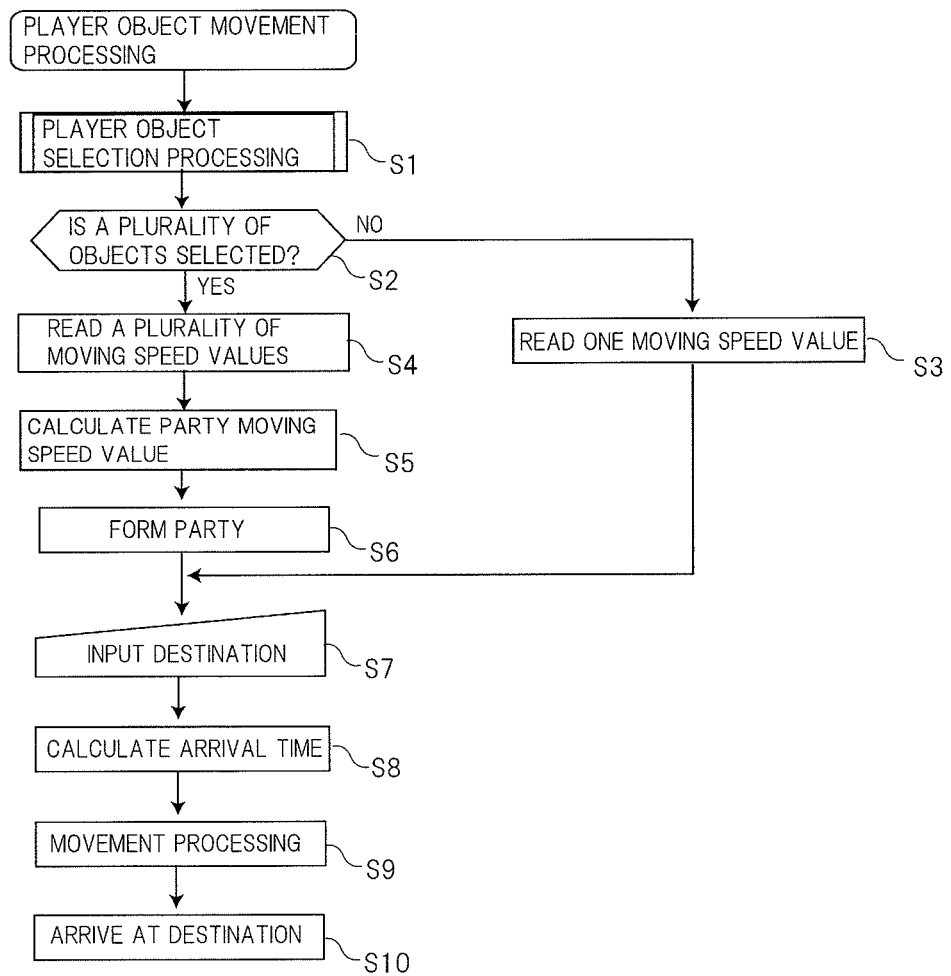
FIG. 3 illustrates a flow of movement control processing executed by the game apparatus according to the present invention.
Figure 4:
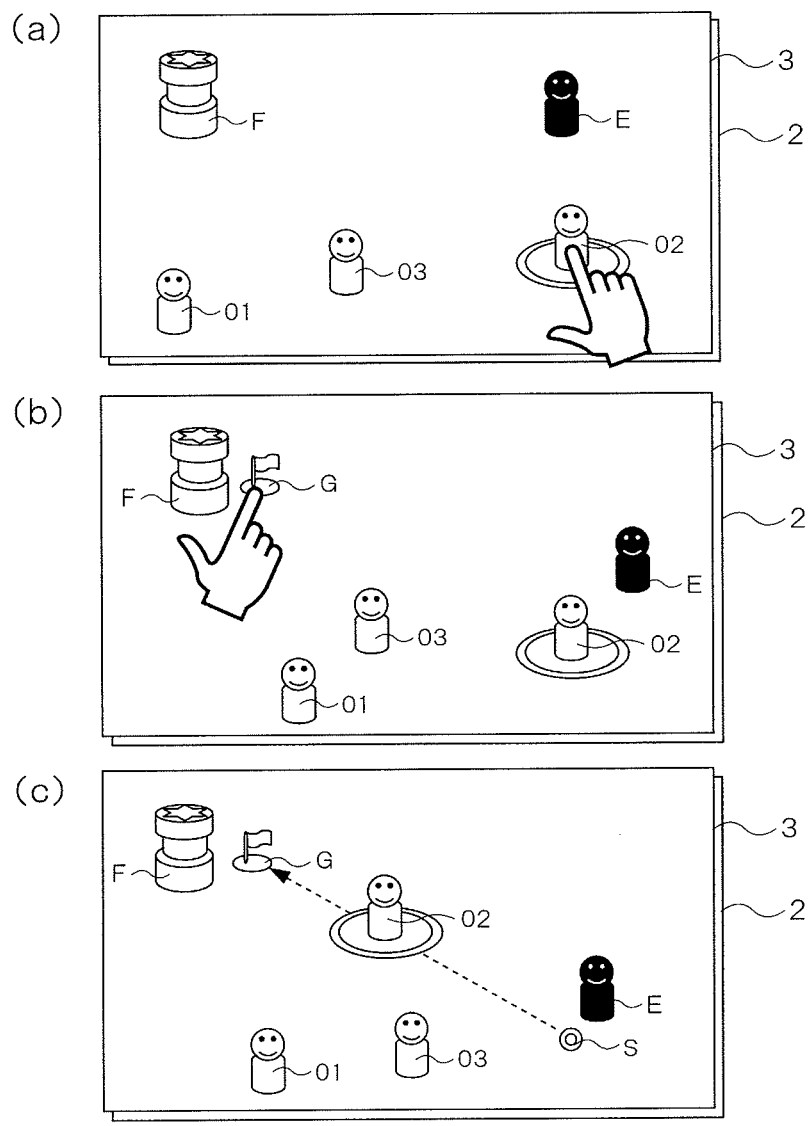
FIGS. 4(a) to 4(c) are schematic views illustrating examples of control of moving a player object as a single object.

FIG. 3 illustrates a main routine of player object movement processing executed by the game apparatus according to the present invention. That is, the control unit 30 of the game apparatus reads the control program stored in the memory unit 10, and executes the processing illustrated in FIG. 3 according to the read control program. Hereinafter, processing of the control unit 30 of moving one or a plurality of player objects displayed on the display unit 2 to an arbitrary destination will be described. Further, FIGS. 4 and 5 are schematic views illustrating how player objects move in the game space according to the flow illustrated in FIG. 3. FIGS. 4(a) to 4(c) illustrate how one player object moves, and FIGS. 5(a) to 5(d) illustrate how a plurality of player objects moves.

Particularly, an embodiment will be described as an example where the touch panel display is formed with the display unit 2 and the coordinate input unit 3.

Step S1 is processing of selecting one or a plurality of player objects displayed on the display screen. Although a preferred embodiment of processing of selecting player objects will be described below with reference to FIGS. 6 and 7, the processing of selecting player objects can basically adopt known processing.

For example, FIG. 4(a) illustrates a state where one player object O2 among a plurality of player objects O1 to O3 displayed on the display unit 2 is selected. As illustrated in FIG. 4(a), when the user touches the coordinate input unit 3 arranged in front of the display unit 2, the object selecting unit 4 receives a signal from the coordinate input unit 3 and detects the input coordinate. Further, the object selecting unit 4 learns display coordinates of the player objects O1 to O3 on the display screen, so that it is possible to decide whether or not one of the player objects O1 to O3 is touched by cross-checking the display coordinates of the player objects O1 to O3 and the input coordinate obtained from the coordinate input unit 3. When deciding that display coordinate of one of the player objects O1 to O3 and the coordinate inputted to the coordinate input unit 3 match, the object selecting unit 4 selects one player object O2 by temporarily storing information about the player object O2 the coordinate of which matches with the input coordinate, in the memory unit 10.

In addition, a reference symbol F indicates a fixed object which does not move in the game space, and a reference symbol E indicates a non-player object which moves in the game space irrespectively of a user's operation or an enemy player object which moves in the game space according to another user's operation. Even when a display coordinate of the fixed object F or the enemy player object E matches with the coordinate inputted to the coordinate input unit 3, the fixed object F and the enemy player object E may not be a movement control target.

On the other hand, FIG. 5(a) illustrates a state where a plurality of player objects O1 to O3 among a plurality of player objects O1 to O3 displayed on the display unit 2 is selected. As illustrated in FIG. 5(a), when the user drags the coordinate input unit 3 arranged in front of the display unit 2, the area specifying unit 6 specifies a rectangular area R a diagonal line of which is a line connecting a start point and an end point of the dragging operation. Subsequently, the object selecting unit 4 cross-checks coordinate information in the area R specified by the area specifying unit 6 and the display coordinate of each of the player objects O1 to O3, and decides whether or not the player objects O1 to O3 are included in the area R. Further, when deciding that the player objects O1 to O1 are included in the specified area R, the object selecting unit 4 selects a plurality of player objects by temporarily storing information about all player objects O1 to O3 included in the specified area R in the memory unit 10.

In step S2, when the player objects are selected in step S1, the movement control unit 5 decides whether or not a plurality of player objects is selected. The movement control unit 5 makes such decision based on whether a single or a plurality of pieces of information of a plurality of player objects is temporarily held in the memory unit 10 by the object selecting unit 4. When a single player object is selected, the flow proceeds to step S3, and, when a plurality of player objects is selected, the flow proceeds to step S4.

In step S3, when the single player object is selected, the movement control unit 5 reads a moving speed value of one selected player object from the object memory unit 1. The object table 1a is stored in the object memory unit 1. In this object table 1a, a numerical value of the moving speed is associated with each player object and stored. Consequently, the movement control unit 5 can read the numerical value of the moving speed of the one selected player object by referring to the object table 1a. Subsequently, the flow proceeds to step S7 to stand by for an input of a destination to which the one selected player object is moved.

On the other hand, in step S4, when a plurality of player objects is selected, the movement control unit 5 reads numerical values of moving speeds of a plurality of selected player objects referring to the object table 1a of the object memory unit 1. Subsequently, in step S5, the movement control unit 5 calculates a numerical value of a party moving speed based on the numerical values of the moving speeds of a plurality of player objects read from the object memory unit 1. The party moving speed refers to one velocity calculated in order to move a plurality of selected player objects at a constant velocity. When a plurality of player objects is selected, these player objects form a party, and move in the game space according to the calculated party moving speed.

Meanwhile, an example of a method of calculating the party moving speed value in step S5 will be described.

For example, the movement control unit 5 preferably determines the slowest (lowest) value among the moving speed values of a plurality of selected player objects as the party moving speed. As illustrated in, for example, FIG. 5(a), the player objects O1 to O3 are selected. As illustrated in the object table 1a in FIG. 2, the moving speed values of the player objects O1 to O3 are, for example, "250" for the player object O1, "80" for the player object O2 and "150" for the player object O3. In such a case, the movement control unit 5 can determine the slowest moving speed value "80" of the player object O2 as the party moving speed value referring to the moving speed value of each of the player objects O1 to O3.

Further, the movement control unit 5 may calculate the average value of the moving speed values of a plurality of selected player objects as the party moving speed. When the moving speed values of the player objects O1 to O3 are "250", "80" and "150", respectively, as in the above example, the average value of these moving speed values is "160". In such a case, the movement control unit 5 can determine the average value "160" of the moving speed values of a plurality of player objects as the party moving speed value.

Further, the movement control unit 5 may determine the moving speed value of the player objects as the party moving speed value based on a parameter other than the moving speed values. For example, a value of an influence force is associated with each player object and stored in the object table 1a illustrated in FIG. 2. As illustrated in the object table 1a in FIG. 2, the influence force values of the player objects O1 to O3 are, for example, "160" for the player object O1, "250" for the player object O2 and "300" for the player object O3. In this case, the movement control unit 5 decides that the player object O3 is a player object having the highest influence force. Further, the movement control unit 5 determines the moving speed value "150" of the player object O3 having the highest influence force as the party moving speed value.

The method of calculating the party moving speed value is not limited to the above example, and, in addition, the fastest (highest) value among the moving speed values of a plurality of selected player objects can also be determined as the party moving speed value. Further, for example, a moving speed value of a player object having the highest attack force or defense force can also be determined as the party moving speed value.

In next step S6, processing of gathering a plurality of player objects selected by the object selecting unit 4 and forming a party is performed. As illustrated in FIG. 5(*b*), when, for example, a plurality of player objects O1 to O3 is selected, the movement control unit 5 extracts coordinate points at which the player objects O1 to O3 are positioned at the point of time of selection. Further, the player objects O1 to O3 gather at a gravity coordinate point obtained by averaging the extracted coordinate points per coordinate axis. By so doing, as illustrated in FIG. 5(*b*), a plurality of selected player objects O1 to O3 are gathered to form a party. When the party is formed, the flow proceeds to step S7 to stand by for an input of the destination of moving a plurality of player objects which forms the party.

In step S7, a coordinate of the destination for moving one or a plurality of selected player objects is inputted. As illustrated in, for example, FIGS. 4(*b*) and 5(*c*), the user can specify a destination G for moving one or a plurality of player objects selected in step S1 through the coordinate input unit 3. Information about the coordinate of the destination G inputted through the coordinate input unit 3 is temporarily stored in the coordinate memory unit 7.

In next step S8, the movement control unit 5 calculates a time which one or a plurality of selected player objects takes to arrive at the destination. As illustrated in, for example, FIG. 4(*c*), when one player object O2 is selected, the movement control unit 5 first calculates a distance between an initial position S and the destination G (for example, a direct distance) based on the coordinate value of the initial position S at which the player object O2 is positioned at the point of time of selection and the coordinate value of the destination G. Further, the movement control unit 5 computes a time which the player object O2 takes to move from the initial position S to the destination G, based on the moving speed of the player object O2 read in step S3 and the distance from the initial position S to the destination G. A computed arrival time is temporarily stored in the memory unit 10. In addition, when there is an obstacle or a route between the initial position and the destination G, the movement control unit 5 can also compute a time which a player object takes to move from the initial position S to the destination G taking into account that the player object moves by hedging the obstacle or moves along the route.

On the other hand, as illustrated in FIG. 5(*d*), when a plurality of player objects O1 to O3 is selected, the movement control unit 5 calculates the distance (for example, a direct distance) from a gathering position S to the destination G based on a coordinate value of the gathering position S of the player objects O1 to O3 and the coordinate value of the destination G. Further, the movement control unit 5 computes the time which the party formed by the player objects O1 to O3 takes to move from the gathering position S to the destination G based on the party moving speed calculated in step S5 and the distance between the gathering position S and the destination G. That is, instead of calculating a time to arrive at the destination individually for each of the player objects O1 to O3, the movement control unit 5 calculates the arrival time when the player objects O1 to O3 move at the constant velocity according to the party moving speed. A computed arrival time is temporarily stored in the memory unit 10.

In next step S9, the movement control unit 5 performs control of moving one or a plurality of selected player objects to a specified destination. In this case, the movement control unit 5 preferably performs processing of moving each player object in game space such that each player object arrives at the destination according to the arrival time calculated in step S8. As illustrated in, for example, FIG. 4(*c*), when one player object O2 is selected, the movement control unit 5 moves each player object in the game space according to the moving speed value "80" of the player object O2 stored in the object table 1*a*. On the other hand, as illustrated in, for example, FIG. 5(*d*), when a plurality of player objects O1 to O3 forms a party, the movement control unit 5 moves the player objects in the game space according to the party moving speed calculated in step S5. While the player objects are moving, for example, motion data stored in the object table 1*a* is repeatedly played back to provide rendition that the player objects march. Further, while the player objects are moving, the movement control unit 5 may display the arrival time calculated in step S8 on the display unit 2, and present a moving time of the player objects to the user. Furthermore, when each player object encounters an enemy player object while moving, processing of playing a match game between the player object and the enemy player object may be performed. Upon a match game, various known games can be played by, for example, utilizing status data of each object stored in, for example, the object table 1*a*.

In step S10, when one or a plurality of selected player objects arrives at the destination, processing of moving the player objects is finished. When the player objects arrive at the destination, each player object stands by for an input of selection. Further, at a stage when each player object arrives at the destination, a game may be advanced according to the game program.

Figure 6:
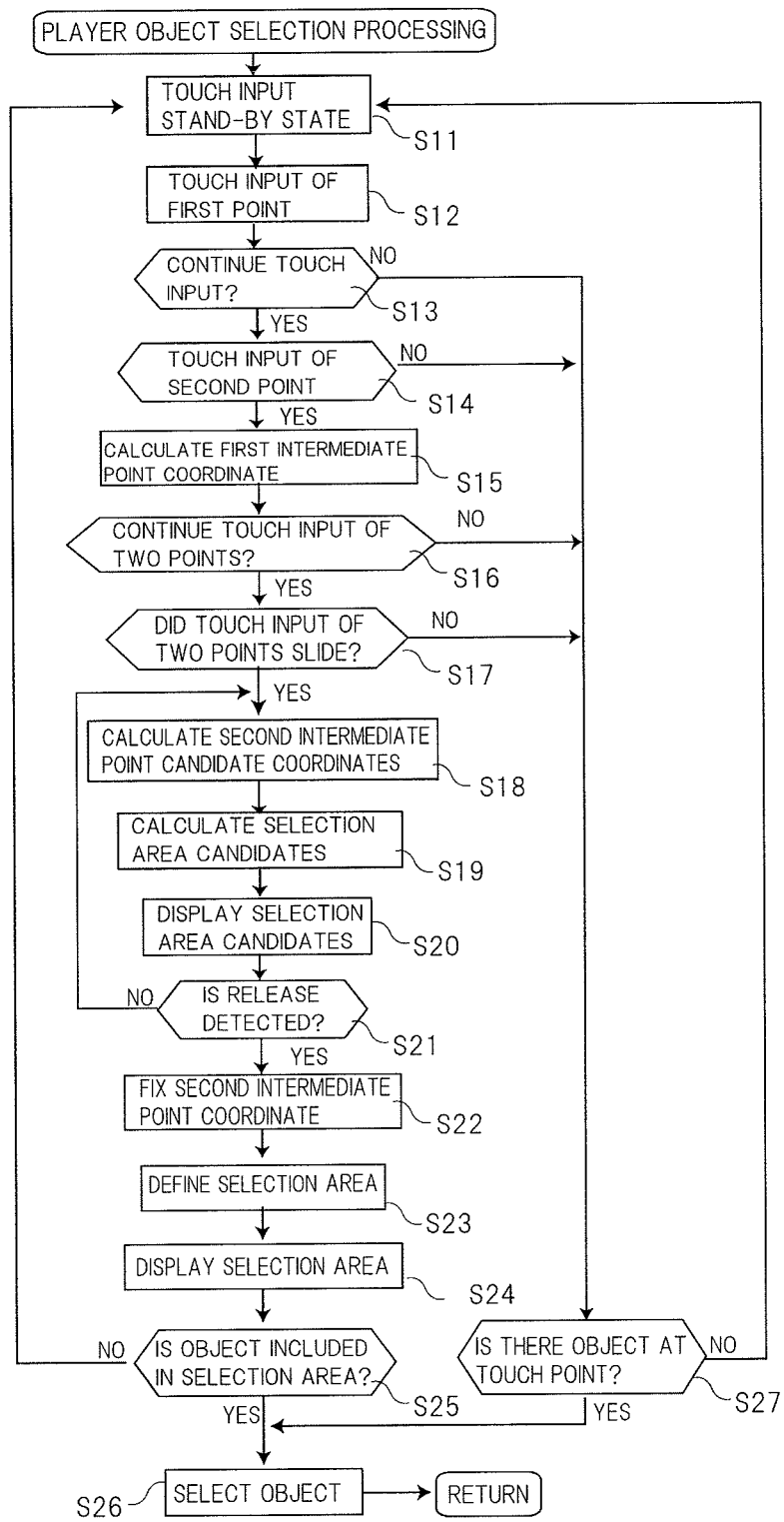
FIG. 6 illustrates a flow of object selection processing executed by the game apparatus according to the present invention.
Figure 7:
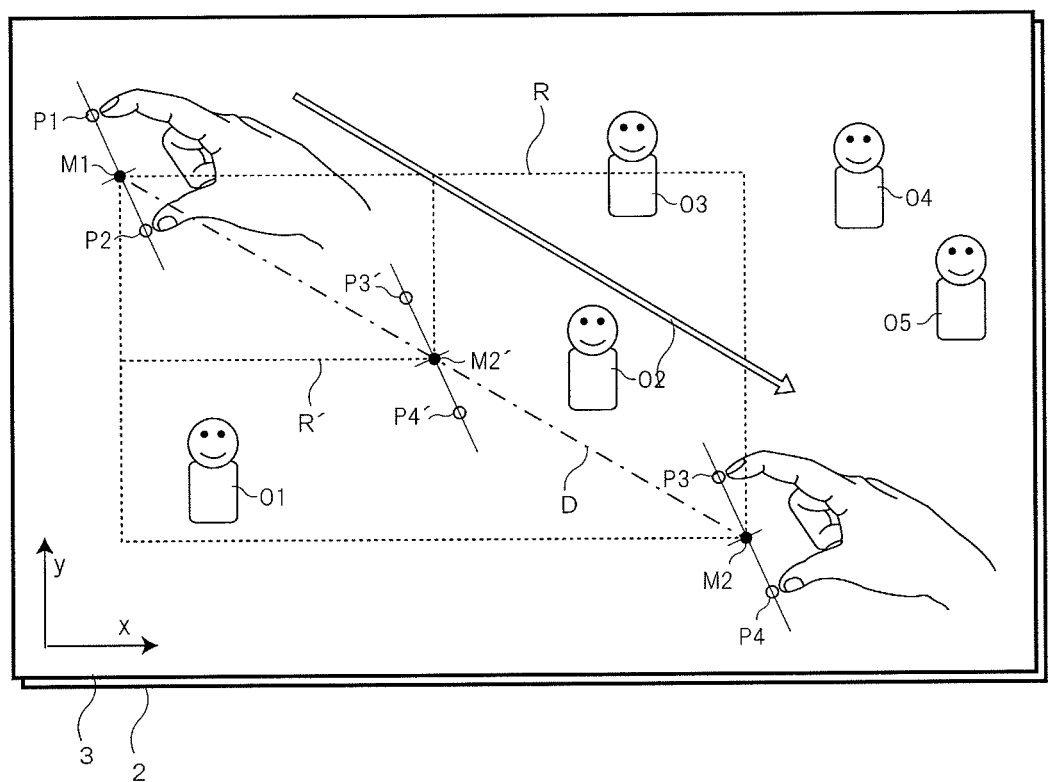
FIG. 7 is a schematic diagram schematically illustrating an object selecting operation.

Subsequently, a preferred embodiment of processing of selecting player objects in step S1 illustrated in the flowchart of FIG. 3 will be described. FIG. 6 is a flowchart illustrating a subroutine of processing of selecting a player object. Processing of the object selecting unit 4 of selecting one or a plurality of player objects among player objects displayed on the touch panel display formed by the display unit 2 and the coordinate input unit 3 is specifically illustrated. Further, FIG. 7 is a schematic view illustrating object selection processing executed by the game apparatus.

Step S11 is a touch input stand-by state in which the coordinate input unit 3 of the touch panel display does not detect a touch input. As illustrated in FIG. 7, at this stage, the display unit 2 of the touch panel display displays a plurality of objects O1 to O5 read from the object memory unit 1. Naturally, a plurality of objects O1 to O5 may move on the screen of the display unit 2 or stop under control of the movement control unit 5. Further, in addition to the objects O1 to O5, for example, a background image, a fixed object and an enemy player object may be displayed on the screen of the display unit 2.

In step S12, the coordinate input unit 3 detects a touch input of a first point. As illustrated in FIG. 7, a touch point P1 of the first point is, for example, a point at which a user's forefinger contacts the coordinate input unit 3. When the coordinate input unit 3 detects an input of the touch point P1 of the first point, the object selecting unit 4 of the control unit 30 acquires information about a coordinate of the touch point P1 of the first point, and temporarily stores the acquired coordinate information in the coordinate memory unit 7.

In step S13, the object selecting unit 4 decides whether or not the touch input of the first point continues, based on the information detected by the coordinate input unit 3. When it is decided that the touch input of the first point continues, the flow proceeds to step S14, and, when it is decided that the touch input of the first point does not continue, the flow proceeds to step S27.

In step S14, the control unit 30 decides whether or not a touch input of a second point is performed while the touch input of the first point continues, based on the information detected by the coordinate input unit 3. As illustrated in FIG. 7, a touch point P2 of the second point is, for example, a point at which the user's thumb contacts the coordinate input unit 3. When the coordinate input unit 3 detects an input of the touch point P2 of the second point, the object selecting unit 4 acquires information about a coordinate of the touch point P2 of the second point, and temporarily stores the acquired coordinate information in the coordinate memory unit 7. When it is decided that the touch input of the second point is performed while the touch input of the first point continues, the flow proceeds to step S15, and, when it is decided that the touch input of the second point is not performed, the flow proceeds to step S27. In addition, in the touch input stand-by state (step S11), when the touch input of the first point and the touch input of the second point are simultaneously detected, processings in step S2 to step S4 are simultaneously performed, and the flow proceeds to step S5.

In step S15, the area specifying unit 6 of the control unit 30 reads the information about the coordinates of the touch point P1 of the first point and the touch point P2 of the second point from the coordinate memory unit 7, and calculates the coordinate of a first intermediate point M1 based on these pieces of coordinate information. In an example illustrated in FIG. 7, the first intermediate point M1 is set to just an intermediate point between the touch point P1 of the first point and the touch point P2 of the second point. That is, the first intermediate point M1 is set to a position at which distances to the touch point P1 of the first point and the touch point P2 of the second point are equal on a line segment connecting the touch point P1 of the first point and the touch point P2 of the second point. Meanwhile, the position to which the first intermediate point M1 is set is not limited to the above, and may be any position as long as the position can be set based on the information about the coordinates of the touch point P1 of the first point and the touch point P2 of the second point. For example, the first intermediate point M1 may be set to a position at which distances to the touch point P1 of the first point and the touch point P2 of the second point are 6:4 on the line segment connecting the touch point P1 of the first point and the touch point P2 of the second point. In addition, the ratio of distances to the touch point P1 of the first point and the touch point P2 of the second point can be arbitrarily set. In addition, the coordinate of the first point can be set based on coordinate information of the touch point P1 of the first point and the touch point P2 of the second point according to various conditions.

Further, with another example, the first intermediate point M1 may be provided at a position of a top of an isosceles triangle in which the touch point P1 of the first point and the touch point P2 of the second point are positioned at base angles. That is, the first intermediate point M1 is set to a position spaced a height of the isosceles triangle apart from the line segment connecting the touch point P1 of the first point and the touch point P2 of the second point. Thus, by setting the first intermediate point M1 at a position spaced a predetermined distance apart from the line segment connecting the touch point P1 of the first point and the touch point P2 of the second point, it is possible to provide an advantage that the user can easily view the position of the first intermediate point M1 displayed on the display unit 2. That is, if the first intermediate point M1 is set on the line segment connecting the touch point P1 of the first point and the touch point P2 of the second point, there is a problem that the first intermediate point M1 hides behind the user's hand depending on a viewing angle and is hard to view. In this regard, by setting the first intermediate point M1 to a position to the top of the isosceles triangle, it is possible to prevent the first intermediate point M1 from hiding behind the user's hand, so that user can easily learn the position of the first intermediate point M1.

The coordinate of the first intermediate point M1 calculated in step S15 is temporarily stored in the coordinate memory unit 7. When calculation of the coordinate of the first intermediate point M1 is finished, the flow proceeds to step S16.

In step S16, the area specifying unit 6 decides whether or not the touch input of the first point and the touch input of the second point continue, based on information detected by the coordinate input unit 3. When it is decided that the touch inputs of the first point and the second point continue, the flow proceeds to step S17, and, when it is decided that one or both of the touch inputs of the first point and the second point do not continue, the flow proceeds to step S27.

In step S17, the area specifying unit 6 decides whether or not the touch inputs of the two points slide in a state where the touch inputs of the first point and the second point continue. That the touch inputs slide means that detected coordinates of the touch inputs are continuously displaced. To sum up, in step S17, whether or not the user's two fingers (for example, the forefinger and the thumb) move tracing on the screen in a state where the user's two fingers are in contact with the coordinate input unit 3. The area specifying unit 6 can decide that the touch inputs of two points slide, based on the coordinate information continuously detected by the coordinate input unit 3. The coordinate information which is continuously detected when the touch inputs of two points slide is occasionally stored in the coordinate memory unit 7. When it is decided that the touch inputs of the two points slide, the flow proceeds to step S18, and, when it is decided that one or both of the touch inputs of the first point and the second point do not slide, the flow proceeds to step S27.

In step S18, the area specifying unit 6 reads from the coordinate memory unit 7 the coordinate information continuously detected when the touch inputs of the two points slide, and occasionally calculates coordinates of second intermediate point candidates based on the information about the coordinates of the touch points of the two points.

The "second intermediate point" is a point calculated from coordinates of last two points based on the coordinates of the last two points detected immediately before the coordinates of the two points stop being simultaneously inputted. The "second intermediate point candidate" is a point which can be the second intermediate point.

In FIG. 7, a reference numeral P3 refers to a touch point (a release point of the forefinger) of a third point detected by the coordinate input unit 3 immediately before the slide input continuing from the touch point P1 of the first point is released, and a reference numeral P4 refers to a touch point (a release point of the thumb) of a fourth point detected by the coordinate input unit 3 immediately before the slide input continuing from the touch point P2 of the second point is released. The coordinate of the "second intermediate point M2" can be calculated from the coordinate of the touch point of the third point and the coordinate of the touch point of the fourth point. Conditions for calculating the coordinate of the second intermediate point M2 may be the same as the conditions for calculating the coordinate of the first intermediate point M1.

Meanwhile, FIG. 7 illustrates that a reference numeral P3' refers to a halfway point at which the slide input is continuing from the touch point P1 of the first point, and a reference numeral P4' refers to a halfway point at which the slide input is continuing from the touch point P2 of the second point. There are a plurality of these halfway points (P3' and P4'), and, when slide inputs continue, the coordinates of the halfway points (P3' and P4') are continuously stored in the coordinate memory unit 7. Coordinates of the "second intermediate point candidates M2'" are continuously calculated based on these halfway points (P3' and P4'). Conditions for calculating the coordinate of the second intermediate point candidate M2' may be the same as the conditions for calculating the coordinate of the second intermediate point M2. The calculated coordinates of the second intermediate point candidates M2' are occasionally stored in the coordinate memory unit 7. When the coordinates of the second intermediate point candidates M2' are calculated, the flow proceeds to step S19.

In step S19, the area specifying unit 6 calculates selection area candidates A' based on the above-described coordinate of the first intermediate point M1 and coordinates of the second intermediate point candidates M2'. The selection area candidate A' is an area which can be a selection area A described below. A selection area candidate R' is a rectangular area a diagonal line of which is, for example, a line segment connecting the first intermediate point M1 and the second intermediate point candidate M2'. A shape and an area of the selection area candidate R' change when touch inputs of two points slide and the coordinate of the second intermediate point candidate M2' changes. Hence, the selection area candidates R' are continuously calculated according to changes in the coordinates of the second intermediate point candidates M2'. When the selection area candidates R' are calculated, the flow proceeds to step S20.

In step S20, the control unit 30 displays the selection area candidates R' calculated in step S19, on the display unit 2. As described above, the selection area candidates R' are continuously calculated, and displayed on the display unit 2 every time the selection area candidate R' is calculated. By this means, the user can check the selection area candidates R' from the display of the display unit 2, and can adjust a touch position such that an object which the user desires to select is included in the selection area candidates R'. When the selection area candidates R' are displayed, the flow proceeds to step S21.

In step S21, the area specifying unit 6 decides whether or not slide inputs continuing from the touch point P1 of the first point and the touch point P2 of the second point are released. That is, the area specifying unit 6 may decide that the slide inputs are released when the coordinate input unit 3 no longer detects touch inputs continuing from the touch point P1 of the first point and the touch point P2 of the second point. When it is decided that the slide inputs are released, the flow proceeds to step S22. On the other hand, when it is decided that the slide inputs are continuing without being released, processings in step S18 to step S20 are repeated until release of the slide inputs is detected.

In step S22, the area specifying unit 6 decides the coordinate of the second intermediate point M2. That is, as illustrated in FIG. 7, the area specifying unit 6 acknowledges points detected by the coordinate input unit 3 immediately before the slide inputs are released in step S21 as the touch point P3 of the third point and the touch point P4 of the fourth point. In addition, the touch point P3 of the third point is a touch point detected by the coordinate input unit 3 immediately before the slide input continuing from the touch point P1 of the first point is released. Further, the touch point P4 of the fourth point is a touch point detected by the coordinate input unit 3 immediately before the slide input continuing from the touch point P2 of the second point is released. Furthermore, the area specifying unit 6 calculates the coordinate of the second intermediate point M2 based on the coordinate of the touch point P3 of the third point and the coordinate of the touch point P4 of the fourth point. Conditions for calculating the coordinate of the second intermediate point M2 may be the same as the conditions for calculating the coordinate of the first intermediate point M1. The coordinate of the second intermediate point M2 is stored in the coordinate memory unit 7. When the coordinate of the second intermediate point M2 is calculated, the flow proceeds to step S23.

In step S23, the area specifying unit 6 defines a selection area R on the display screen of the display unit 2 based on the above coordinate of the first intermediate point M1 and coordinate of the second intermediate point M2. In an example illustrated in FIG. 7, the selection area R is a rectangular (square) area a diagonal line of which is a line segment D connecting the coordinate of the first intermediate point M1 and the second intermediate point M2 and a periphery of which is defined by two sides parallel to a Y axis of the display screen and two sides parallel to the X axis. When the selection area R is specified, the coordinate of each top of the shape of the selection area R is temporarily stored.

Meanwhile, the shape of the selection area R is not limited to the above, and has a shape determined based on coordinates of two points of the first intermediate point M1 and the second intermediate point M2. For example, the selection area R can be a polygonal area a diagonal line of which is the line segment D connecting the coordinate of the first intermediate point M1 and the second intermediate point M2. Further, the selection area R can be a perfect circular area a diameter of which is the line segment D connecting the coordinate of the first intermediate point M1 and the second intermediate point M2. Furthermore, the selection area R may be an elliptical area a major axis of which is the line segment D connecting the coordinate of the first intermediate point M1 and the second intermediate point M2. In this case, the length of a minor axis of the elliptical area may be a fixed value, or a value proportional to the major axis. Thus, the shape of the selection area R can be adequately set according to use thereof.

In step S24, the control unit 30 displays the defined selection area R on the display unit 2. By this means, the user can check the selection area R based on the display on the display unit 2.

In step S25, the object selecting unit 4 decides whether or not there is a player object in the selection area R selected by the area specifying unit 6. Positions at which there is a plurality of player objects displayed on the screen are learned by the control unit 30. Consequently, by referring to the coordinate of each top of the shape of the selection area R on the display screen and the coordinates at which there are the objects, it is possible to decide whether or not the player objects are included in the selection area R. In the example illustrated in FIG. 7, the player objects O1 to O5 are displayed on the screen of the display unit 2. Among these player objects, the player objects O1 to O3 are entirely or partially included in the selection area R. On the other hand, the player objects O4 and O5 are entirely positioned outside the selection area R. Hence, the object selecting unit 4 decides that the player objects O1 to O3 of a plurality of player objects O1 to O5 are included in the selection area R. When there are objects in the selection area R on the display screen, the flow proceeds to step S26.

Meanwhile, when there is not any object in the selection area R, the flow returns to step S1 and a touch input stand-by state starts again.

In step S26, the object selecting unit 4 selects one or a plurality of objects which is decided to be included in the selection area R. Information (for example, an identification number of each object) related to the selected objects is temporarily stored in a working area of the memory unit 10.

Further, as illustrated in the flowchart in FIG. 6, when the touch input of the second point is not performed while the touch input of the first point continues or, even though the touch input of the second point is performed, a simultaneous slide input of the two points is not performed, the flow proceeds to step S27. In this case, in step S27, whether or not an object on the display screen is positioned at the touch point P1 of the first point is decided as conventionally performed. Meanwhile, the coordinate of the touch point P1 of the first point and the coordinate at which there is the object on the display screen are referred to and, when both of the coordinates match, the flow proceeds to step S26.

In step S26, the object selecting unit 4 selects one object the coordinate of which matches with the touch point P1 of the first point. The information related to the selected object is temporarily stored in the working area of the memory unit 10.

As described above, the object selecting unit 4 performs processing of selecting one or a plurality of player objects of the player objects displayed on the display unit 2. When the object selecting unit 4 selects an object, the flow returns to the main routine illustrated in FIG. 3 to proceed to processing of controlling movement of player objects.

(2. Specific Configuration of Game Apparatus)

Next, a specific configuration of a game apparatus according to the present invention will be described. The game apparatus according to the present embodiment has a touch panel display and a card reader. Further, the game apparatus advances a game by displaying one or a plurality of player objects on the touch panel display according to a card set on the card reader, and controlling movement of a player object selected from one or a plurality of displayed player objects.

[Configuration Example of Game Apparatus]

Figure 8:
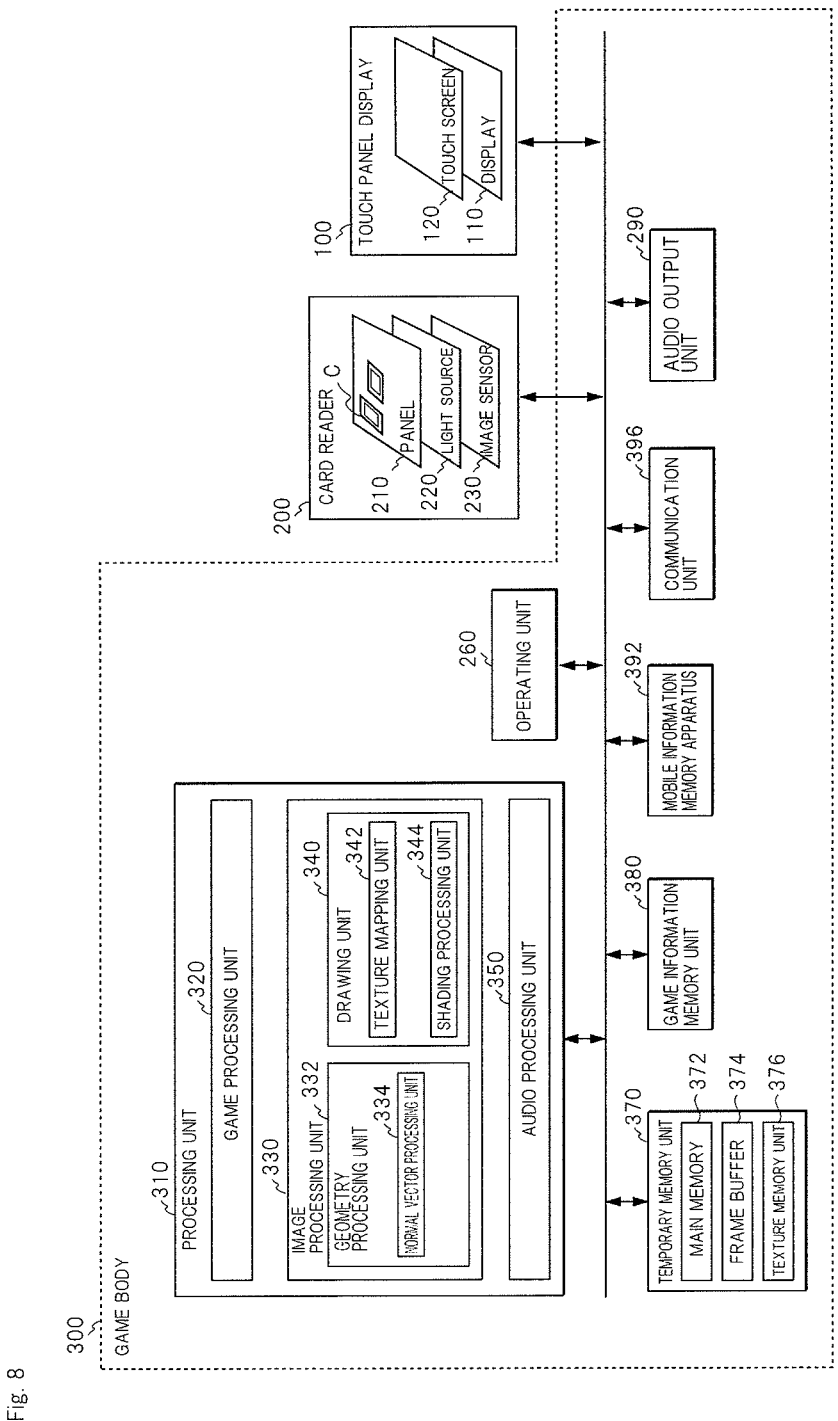
FIG. 8 is a block diagram illustrating a configuration example of the game apparatus according to the present invention.
Figure 9:
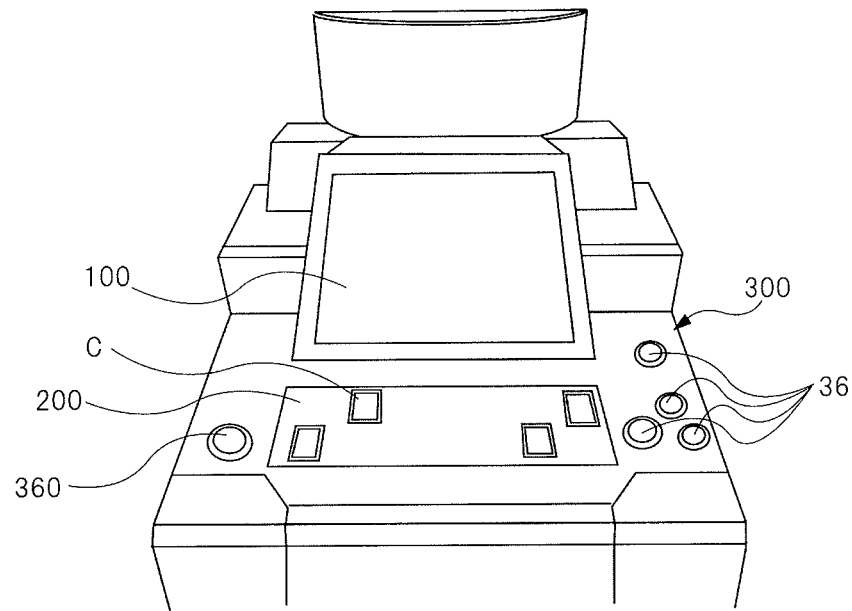
FIG. 9 is a perspective view illustrating an example of an outlook of the game apparatus according to the present invention.

FIG. 8 is a block diagram illustrating a configuration example of the game apparatus. The embodiment illustrated by this block diagram can be suitably used for an arcade game apparatus in particular. FIG. 9 is a perspective view illustrating an example of an outlook of a housing of the game apparatus.

As illustrated in FIG. 8, the game apparatus has a touch panel display 100, a card reader 200 and a game body 300. The touch panel display 100 is configured to display various items of image data as an image which the user can view, and detect the coordinates which the user touches on the display screen. Further, when a card with a predetermined identification code printed thereon is set on the card reader 200, the card reader 200 is configured to read the identification code recorded in this card and acquire unique card information of the card. Furthermore, the game body 300 controls the entire function of the game apparatus. Particularly, the game body 300 can display a player object on the touch panel display 100 based on the information read by the card reader 200, and advance a game based on a card operation with respect to the card reader 200 and touch control with respect to the touch panel display 100.

As illustrated in FIG. 8, the touch panel display 100 has the display 110 and the touch screen 120. The touch panel display 100 is formed by disposing the touch screen 120 formed using a transparent material, in front of the display 100 which can display images. The display 110 is a display apparatus such as a LCD (Liquid Crystal Display) or an OELD (Organic Electro Luminescence Display). The display 110 outputs and displays various pieces of information which the user requires to use the information processing apparatus, as a still image or a movie according to an input signal from the game body 300. Further, the touch screen 120 can detect contact of the user's hand or finger according to a known electrostatic capacitance method, electromagnetic induction method, infrared scan method, resistance film method or ultrasonic surface acoustic wave method, and obtain information about the coordinate of the touch position. The positional relationship between the display 110 and the touch screen 120 is mutually linked, and the touch screen 120 can acquire information about the coordinate of a touch position on the display screen displayed on the display 110. By this means, the touch screen 120 can detect contact of the user's finger, and obtain the information about the coordinate on the screen of the display 110 which the user's finger contacted. The coordinate information acquired by the touch screen 120 is stored in a temporary memory unit 370 of the game body 300. Further, the touch screen 120 supports so-called multitouch of, when, for example, the user touches a plurality of points, acquiring information about coordinates of a plurality of these points. Furthermore, the game apparatus according to the present invention preferably has the comparatively large touch panel display 100 mounted thereon. For example, the touch panel display 100 is preferably displays of 10 inches to 75 inches, 16 inches to 40 inches or 20 inches to 38 inches.

As illustrated in FIG. 8, the card reader 200 is an apparatus which can capture an image of an identification code recorded in a card C, and has a panel 210, a light source 220 and an image sensor 230. For example, an illustration of a player object used in a game is printed on the surface of the card C, and an identification code for identifying the player object printed on the surface is recorded on the back surface of the card C. Further, for example, an identification code is printed on the back surface of the card C using an ink which cannot be viewed by means of visible light, and a pattern printed using black and white appears when specific invisible light is radiated on the card. The identification code is printed using a special ink which absorbs invisible light such as infrared ray and, when infrared ray is radiated on the back surface of the card C, the invisible light radiated on a portion except the black portion of the identification code is reflected. For example, the identification code of the card C has at least an identification number of a player object drawn in the card and information related to, for example, an orientation of the card recorded therein.

The panel 210 is provided on the upper surface of the card reader 200, and a plurality of cards C can be set on the panel 210. Further, inside the housing of the game apparatus, for example, the light source 220 which radiates infrared ray (invisible light) on the back surface of the card C set on the panel 210, and the image sensor 230 which acquires the infrared ray reflected from the back surface of the card C set on the panel 210 and captures an image of a pattern of card data recorded in the card C are provided. The light source 220 is, for example, a light emitting diode (LED) which emits invisible light such as infrared ray or ultraviolet ray which is invisible to the eyes. The image sensor 230 is, for example, an image capturing element which captures an image of an identification code by means of infrared ray which is reflected on the back surface of the card C and is incident on the card reader 200. Further, the card reader 200 can acquire unique card information of the card C by analyzing this identification code. The card information acquired by the card reader 200 is transmitted to a processing unit 310 of the game body 300, and stored in the temporary memory unit 270.

The identification code of the card C has at least an identification number of a player object drawn in the card and information related to, for example, an orientation of the card recorded therein. Hence, by referring to an object table stored in the game information memory unit 380 or the temporary memory unit 270 based on the card information acquired from the card reader 200, the processing unit 310 of the game body 300 can learn a status, a type, a name and an attribute of the player object recorded in the card C and, moreover, the characteristics of the player object matching the orientation or the position of the card C. An example of a player object is a game character. Further, the image sensor 230 of the card reader 200 detects the position at which infrared ray light is reflected from the back surface of the card C, so that the processing unit 310 of the game body 300 can calculate the position at which the card C is set on the panel 210 as coordinate information. Furthermore, the image sensor 230 continuously detects reflection positions of infrared ray, so that it is possible to obtain information that the card C set on the panel 210 moves from a certain position to another position.

Figure 10:
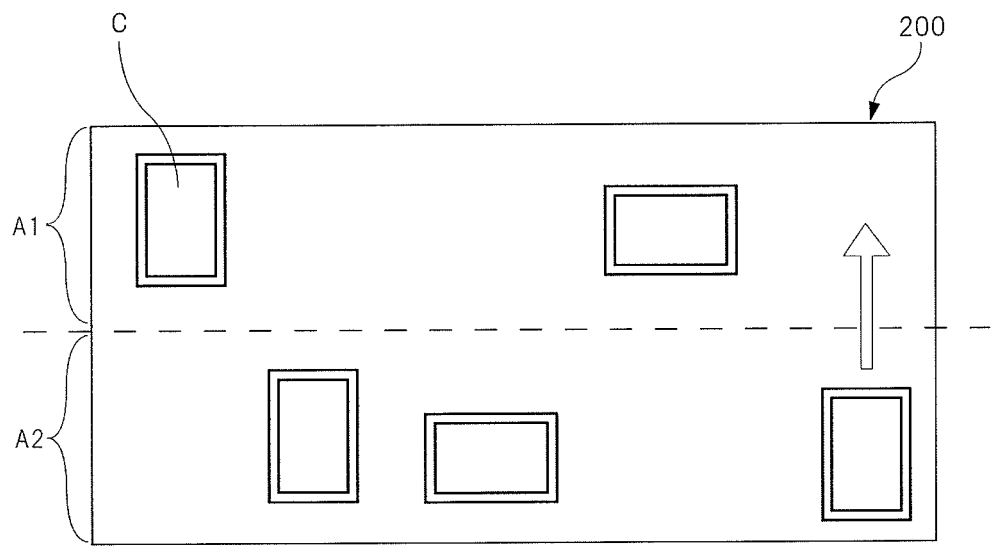
FIG. 10 schematically illustrates a card reader on which a plurality of cards is set.

Still further, as illustrated in FIG. 10, the panel 210 of the card reader 200 is preferably partitioned into a plurality of areas. The number of partitions of the panel 210 can be, for example, 2 to 10. In an example illustrated in FIG. 10, the panel 210 of the card reader 200 is divided into two of an offensive area A1 (first area) and a defensive area A2 (second area). These areas are partitioned according to the coordinate of the panel, and each card C can slide in the offensive area A1 and the defensive area A2. By acquiring the position of each card C on the panel 210 as coordinate information, the processing unit 310 of the game body 300 can decide which one of the offensive area A1 and the defensive area A2 the position of each card C belongs to.

Further, as illustrated in FIG. 10, the rectangular card C can be set vertically or horizontally on the panel 210 of the card reader 200, and the processing unit 310 of the game body 300 can decide whether the card C is set vertically or horizontally, based on detection information from the card reader 200. For example, an identification code is printed on the back surface of the card C. This identification code includes information related to the orientation of the card. Consequently, the processing unit 310 of the game body 300 can decide whether the card C is set vertically or horizontally by reading the identification code by means of the card reader 200 and analyzing the orientation of the card C based on the read identification code.

The game body 300 has the processing unit 310, and reads and executes a game program and controls an entire operation of the game apparatus according to the game program. As illustrated in FIG. 8, the game body 300 has the following configuration.

The processing unit 310 performs various processings such as control of the entire system, an instruction to give a command to each block in the system, game processing, image processing and audio processing. The function of the processing unit 310 can be realized by hardware such as various processors (for example, a CPU or a DSP) or an ASIC (for example, a gate array), or a given program (game program).

The processing unit 310 includes a game processing unit 320, an image processing unit 330 and an audio processing unit 350. More specifically, the processing unit 310 includes a main processor, a coprocessor, a geometry processor, a drawing processor, a data processing processor, and a four arithmetic operation circuit or a generalized arithmetic operation circuit. These processors and circuit are adequately coupled through a bus, and can receive and send signals. Further, the processing unit 310 may have a data extension processor for extending compressed information.

Meanwhile, the game processing unit 320 performs various game processings such as processing of displaying an object on the display 110 based on card information acquired by the card reader 200, processing of scrolling the position of a view point (the position of a virtual camera) or an angle of view (a rotation angle of the virtual camera) on the display 110, processing of arranging an object such as a map object in object space, processing of selecting an object, processing of moving the object (motion processing), processing of calculating the position or the rotation angle of the object (the rotation angle around an X, Y or Z axis), processing of receiving coins (price), processing of setting various modes, processing of advancing a game, processing of setting a selection screen, hit check processing, processing of computing a game result (achievement or score), processing of allowing a plurality of players to play a game in common game space or game-over processing, based on input data from the touch screen 120, the card reader 200 and an operating unit 360 and personal data, stored data and a game program from a mobile information storage apparatus 392.

The image processing unit 330 performs various image processings according to, for example, an instruction from the game processing unit 320. The game processing unit 320 reads image information of an object and game space from the game information memory unit 380 based on information about the position of a view point and an angle of view, and writes the read image information in the temporary memory unit 370. The game processing unit 320 supplies scroll data for moving the view point to the image processing unit 330. The image processing unit 330 reads image information per frame from the temporary memory unit 370 based on given scroll data, and has the display 110 display images of the object and the game space according to the read image information. By this means, the display 110 displays the object and the game space based on the view point. Further, the image processing unit 330 moves the view point in the game space according to the coordinate inputted to the touch screen 120. Furthermore, the image processing unit 330 reads frames from the temporary memory unit 370 based on the information about the moving view point, and has the display 110 display the read image. Thus, by scrolling the view point in the game space, the display screen transitions.

Further, the image processing unit 330 reads the card information acquired from the temporary memory unit 370 by the card reader 200, and refers to the object table stored in a game information memory unit 380 based on this card information. Furthermore, the image processing unit 330 reads image data of the player object associated with the card information from the temporary memory unit 370 or the game information memory unit 380 based on link information stored in the object table. Still further, the image processing unit 330 generates the player object in the game space according to the image data of the read player object, and has the display 110 display the object.

The game processing unit 320 controls a behavior of the object which appears in the game space, based on the information about the coordinate inputted to the touch screen 120, the orientation or the position of the card set on the card reader 200 and operation information from other operating unit 260 (a lever, button or a controller). For example, the game processing unit 320 refers to the coordinate information of the player object displayed on the display 110 and the coordinate information inputted to the display 110, and decides whether or not the user touches the player object. That is, the game processing unit 320 decides that the user touched and selected the player object when position information inputted to the touch screen 120 and position information of the player object match. Further, when an operation or an instruction is given to the selected player object, processing matching a game program is performed according to the operation or the instruction.

Furthermore, the game processing unit 320 preferably performs selection processing unique to the present invention when the player object displayed on the display 110 of the touch panel display 100 is selected. That is, the game processing unit 320 determines the coordinate of the first intermediate point calculated from coordinates of first two points based on the coordinates of the first two points simultaneously inputted to the touch screen 120 of the touch panel display 100. Further, the game processing unit 320 determines the coordinate of the second intermediate point calculated from coordinates of last two points based on the coordinates of the last two points detected immediately before the two coordinates of the two points stop being simultaneously inputted. Furthermore, the game processing unit 320 specifies an area on the display screen of the display 110 based on the coordinate of the first intermediate point and the coordinate of the second intermediate point, and selects one or a plurality of player objects images of which are displayed such that at least part of the objects are included in the specified area. Still further, when the operation or the instruction is given to the selected player object, the game processing unit 320 performs processing matching a game program according to the operation or the instruction.

Moreover, when one or a plurality of player objects is selected according to the input operation with respect to the touch screen 120 and then different coordinate information is inputted to the touch screen 120 again, the game processing unit 320 performs control of moving one or a plurality of selected objects to the coordinate information inputted again. That is, when one player object is selected, the game processing unit 320 reads the information related to the moving speed of one selected player object from the object table, and performs control of moving one selected player object based on the read information related to the moving speed. On the other hand, when a plurality of player objects is selected, the game processing unit 320 reads information related to the moving speeds of a plurality of selected player objects from the object table. Further, the game processing unit 320 determines the party moving speed for moving a plurality of selected player objects as a party based on the read information related to a plurality of moving speeds. Furthermore, control of moving a plurality of selected player objects according to the determined party moving speed is performed. Thus, the game processing unit 320 preferably advances a game by linking the card information acquired by the card reader 200 and the coordinate information inputted to the touch screen 120.

The audio processing unit 350 emits various sounds according to, for example, an instruction from the game processing unit 320.

Functions of the game processing unit 320, the image processing unit 330 and the audio processing unit 350 may all be realized by hardware or may all be realized by programs. Alternatively, these functions may be realized by both of the hardware and the programs.

As illustrated in FIG. 8, for example, the image processing unit 330 has a geometry processing unit 332 (three-dimensional coordinate computing unit) and a drawing unit 340 (rendering unit).

The geometry processing unit 332 performs various geometry computations (three-dimensional coordinate computation) such as coordinate transformation, clipping processing, perspective transformation and light source calculation. Further, object data (for example, top coordinate, top texture coordinate or brightness data of the object) for which geometry processing has been performed (perspective transformation has been performed) is stored in a main memory 372 of the temporary memory unit 370 and kept.

The drawing unit 340 draws the object in a frame buffer 374 based on the object data for which geometry computation has been performed (perspective transformation has been performed) and a texture stored in a texture memory unit 376. The drawing unit 340 includes, for example, a texture mapping unit 342 and a shading processing unit 344. More specifically, the drawing unit 340 can be implemented by a drawing processor. The drawing processor is connected to the texture memory unit, various tables, a frame buffer and a VRAM, and is further connected with the display.

The texture mapping unit 342 reads an environment texture from a texture memory unit 376, and maps the read environment texture on the object.

The shading processing unit 344 performs shading processing with respect to the object. For example, the geometry processing unit 332 performs light source calculation, and calculates brightness (RGB) of each top of the object based on information about the light source for shading processing, an illumination model and a normal vector of each top of the object. The shading processing unit 344 calculates the brightness of each dot of a primitive surface (polygon or curved surface) based on the brightness of each top according to Phong shading or Gouraud shading.

The geometry processing unit 332 includes a normal vector processing unit 334. The normal vector processing unit 334 may perform processing of rotating a normal vector of each top of the object (a normal vector on a plane of the object in a broad sense) according to a rotation matrix from a local coordinate system to a world coordinate system.

The operating unit 360 allows a player to input operation data. The function of the operating unit 360 is realized by a controller having, for example, a lever, a button and hardware. Processing information from the operating unit 360 is sent to the main processor through a serial interface (I/F) or the bus.

The game information memory unit 380 stores game programs, objects displayed on the display 110 and information related to image data in game space. The game information memory unit 380 is, for example, a ROM, and is realized by a non-volatile memory such as an optical disk (CD or DVD), a magnetooptical disk (MO), a magnetic disk, a hard disk or a magnetic tape. The processing unit 310 performs various processings based on information stored in this game information memory unit 380. The game information memory unit 380 stores information (programs or the programs and data) for executing means (a block included in the processing unit 310 in particular) of the present invention (the present embodiment). Part or all of information stored in the game information memory unit 380 may be written to the temporary memory unit 370 when, for example, a power is applied to the system.

The information stored in the game information memory unit 380 includes, for example, at least two of a program code for performing predetermined processing, image data, audio data, shape data of a display object, table data, list data, information for instructing processing of the present invention and information for performing processing according to the instruction. For example, the table data includes data of an object table which stores a status, a type, a name and an attribute of an object, and characteristics of the object matching the orientation or the position of the card, in association with an identification number of the object.

The status of the object is information in which, for example, a moving speed, a hit point, offense power and defense power are stored as numerical values. The game processing unit 320 can decide superiority and inferiority of, for example, the moving speed, the hit point and the offense power of each object by referring to the status stored in the object table. Further, the game processing unit 320 can perform various computations for advancing a game based on these numerical values related to the status. For example, the numerical value of the moving speed of each object is comparable, and, by referring to the object table, it is possible to learn which one of a given object and another object has a faster moving speed. Further, by performing predetermined computation processing based on a numerical value of the moving speed of each object, it is possible to calculate a time which the object requires to move from a give point to another point in game space.

Furthermore, the characteristics of the object matching the orientation of the card are data which changes according to the orientation of the card set on the panel 210 of the card reader 200. For example, as to objects related to a given card, the object table stores information which is different when the card is vertically set or horizontally set. For example, when the card is vertically set and horizontally set, the status of the object may change.

Further, the characteristics of the object matching the position of the card is data which changes according to the position at which the card is set on the panel 210 of the card reader 200. For example, as to objects related to a given card, the object table stores information which is different when the card is positioned in the offensive area A1 (first area) and when the card is positioned in the defensive area A2 (second area). For example, when the card is positioned in the offensive area A1 and when the card is positioned in the defensive area A2, the status of the object may change.

Further, the game information memory unit 380 stores data related to game space. The game space means a world of a game in the game apparatus according to the present invention which is also referred to as a "world". The data related to the game space includes position information of a target object to be displayed, information related to the type of the target object to be displayed and image data of the target object to be displayed. The target object to be displayed is, for example, a background, a building, a landscape, a plant and an object appearing in a game. This image data is preferably stored as polygon data. The polygon data includes, for example, top coordinate data, color data, texture data and transparency data. The game information memory unit 380 classifies and stores a target object to be displayed according to the orientation of a view point, a position and an area of a player character.

An audio output unit 390 outputs an audio. The function of the audio output unit 390 can be realized by hardware such as a speaker. An audio output is applied audio processing by a sound processor connected to, for example, the main processor through the bus, and is outputted from the audio output unit such as the speaker.

The mobile information storage apparatus 392 stores, for example, personal data of a player and saved data. This mobile information storage apparatus 392 is, for example, a memory card or a mobile game apparatus. A function of the mobile information storage apparatus 392 can be achieved by known storage means such as a memory card, a flash memory, a hard disk or a USB memory. Meanwhile, the mobile information storage apparatus 392 is not a necessary configuration, and may be implemented when an identity of the player needs to be identified.

A communication unit 394 is an arbitrary unit which performs various controls for performing communication with an outside (for example, a host server or another game apparatus). By connecting the game apparatus with a host sever on a network or another game apparatus through the communication unit 394, it is possible to play a match play or a combination play of a game. The function of the communication unit 394 can be realized by various processors, hardware such as a communication ASIC or a program. Further, a program or data for executing a game apparatus may be distributed from an information storage medium of a host apparatus (server) to the game information memory unit 380 through the network and the communication unit 394.

[Operation Example of Game Apparatus]

Next, an operation example of the game apparatus employing the above configuration will be described with reference to FIGS. 11 to 13. Hereinafter, the system of the game executed by the game apparatus will be described using an example. For example, the game apparatus according to the present invention can play a match game using communication such as Internet. In this match game, each game user plays a match by having a plurality of player objects (game characters) appear in one game space. In an example of the game described below, the user performs an instruction operation such as appearance, movement, offense and defense of each player object through, for example, the touch panel display 100 and the card reader 200 to beat enemy objects (Enemy), conquer a tower and break a stone.

Figure 11:
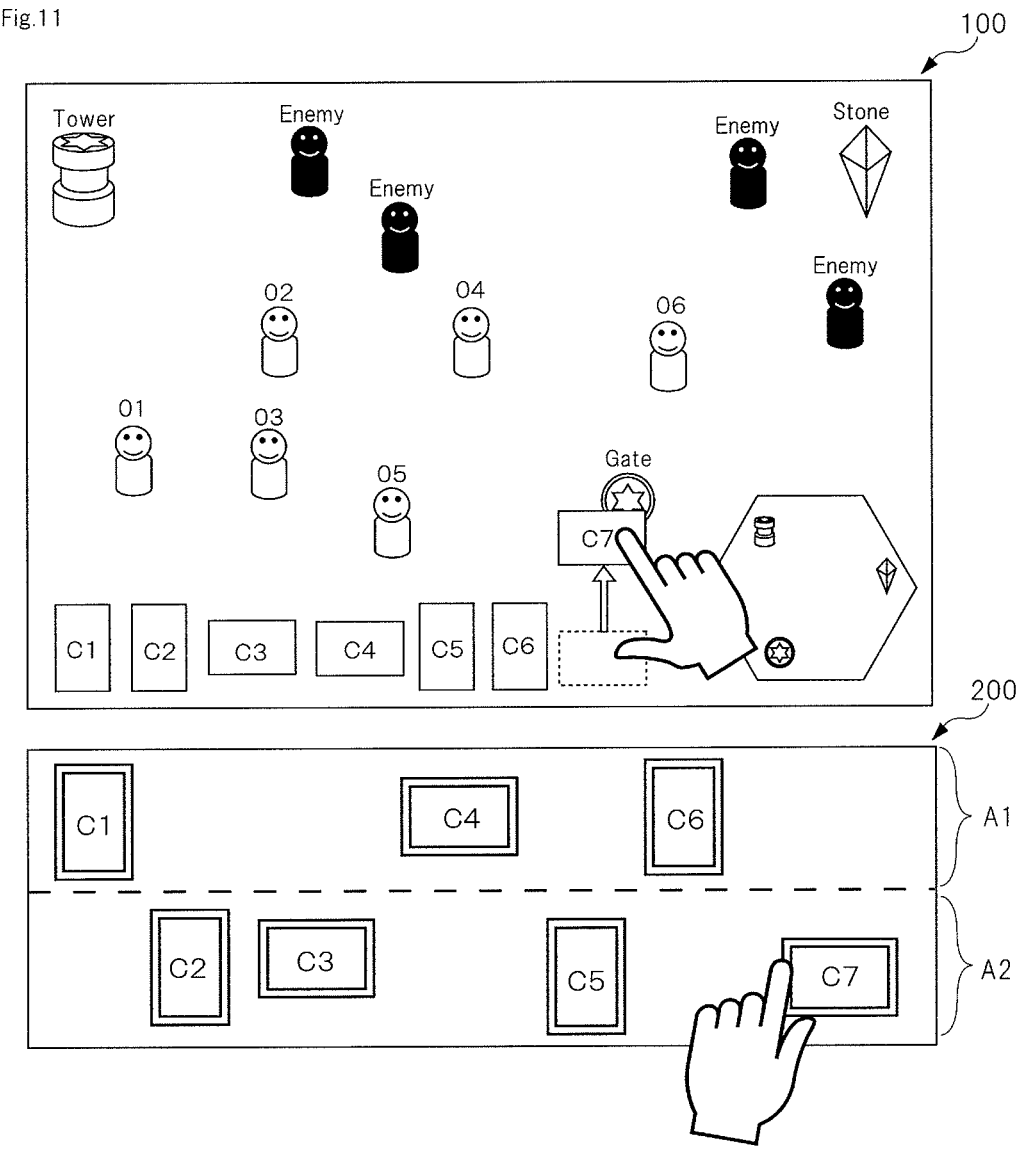
FIG. 11 is a view for describing an example of a game executed by the game apparatus according to the present invention.

FIG. 11 conceptually illustrates states of the touch panel display 100 and the card reader 200 when a game is actually played using the game apparatus according to the present invention. The user sets desired cards C1 to C7 on the card reader 200. The identification code is printed on the back surface of each of the cards C1 to C7. When reading the identification code of each of the cards C1 to C7, the card reader 200 analyzes card information based on the identification code, and transmits card information to the processing unit 310 of the game apparatus. Further, the card reader 200 can learn the orientation and the position of each of the cards C1 to C7. In an example illustrated in FIG. 11, on the card reader 200, the cards C1, C2, C5 and C6 are vertically set, and the cards C3, C4 and C7 are horizontally set. Further, in the example illustrated in FIG. 11, on the card reader 200, the cards C1, C4 and C6 are positioned in the offensive area A1, and the cards C2, C3, C5 and C7 are positioned in the defensive area A2. Information detected by the card reader 200 is transmitted to the processing unit 310, and the processing unit 310 refers to the object table stored in the game information memory unit 380 (or the temporary memory unit 370) based on the card information and information about, for example, the orientation of the card and the position of the card, and reads information (for example, image data and a status) about the player object associated with the card information. The processing unit 310 has the touch panel display 100 display images based on the read image data. For example, the touch panel display 100 displays the images of the cards in a lower area of the touch panel display 100. The images of the cards displayed on the touch panel display 100 match an arrangement order of each of the cards C1 to C7 set on the card reader 200 and the orientation of each of the cards C1 to C7. Thus, by displaying the image of each of the cards C1 to C7 set on the card reader 200, on part of the touch panel display 100, the user can learn an arrangement and the orientation of each of the cards C1 to C7 by viewing the touch panel display 100 without visually checking the card reader 200. In addition, the touch panel display 100 can also display information about the position of each of the cards C1 to C7 set on the card reader 200 (for example, in which one of the offensive area A1 and the defensive area A2 the card is positioned).

In the example illustrated in FIG. 11, the player objects (game characters) O1 to O6 associated with the cards C1 to C6 are displayed on the display screen of the touch panel display 100. Each player object has a unique status, a type, a name, an attribute and characteristics matching the orientation or the position of the card. The status of the player object is information in which, for example, a moving speed, a hit point, offense power and defense power are stored as numerical values. These pieces of information are stored in the object table in association with identification information of each player object. While it is possible to set player objects the cards of which are vertically arranged to carry out normal offenses, it is possible to set player objects the cards of which are horizontally arranged to carry out special offenses. Further, while it is possible to make a setting to increase numerical values of offence power of the player objects the cards of which are positioned in the offensive area A1, it is possible to make a setting to increase numerical values of defense power of player objects the cards of which are positioned in the defensive area A2. Furthermore, in the example illustrated in FIG. 11, the player object (O7) associated with the card C7 is not displayed on the touch panel display 100. To have the object (O7) appear in the game space, the image of the card C7 displayed on the touch panel display 100 is touched, and the image of the card C7 is dragged to the position at which a call gate is displayed. When the image of the card C7 is dropped at the position at which a call gate is displayed, the player object (O7) associated with the card C7 appears in the game space, and is displayed on the touch panel display 100. In addition, the position coordinate of the call gate in the game space is stored in the game information memory unit 380 and the temporary memory unit 370, and the position of the call gate is learned by the game processing unit 320.

FIGS. 12(*a*) and 12(*b*) illustrate examples of an operation of moving player objects displayed on the touch panel display 100. When the user touches the touch panel display 100, the touch panel display 100 obtains the coordinate of the touch position. The processing unit 310 refers to the coordinate of the touch position and the coordinate at which the player object is displayed, and decides whether or not the coordinate of the touch position and the coordinate at which the player object is displayed match. When the touch position and the position of the player object match, the processing unit 310 learns that the player object was selected. In an example in FIG. 12(*a*), the player object O4 is selected. Further, when the user touches the display screen of the touch panel display 100 in a state where the player object O4 is selected, the processing unit 310 stores the coordinate of the touch position in the temporary memory unit. Particularly, when the user touches a plurality of points in a state where the player object O4 is selected, the processing unit 310 stores the coordinates of the touch positions in the temporary memory unit together with information about the touch order. Further, the processing unit 310 performs processing of moving the player object O4 touched and selected by the user to a point which the user touches next. The moving speed varies per player object. Then, the processing unit 310 reads a numerical value of the moving speed related to the player object O4 from the object table. Further, the player object O4 is moved from the first point to a moving destination point based on the numerical value of the read moving speed. Furthermore, when a plurality of points is touched, the selected player object O4 is sequentially moved to each point according to the touch order. In addition, when the moving player object O4 encounters an enemy object during movement or arrives at a tower, processing of playing a match with the enemy object or processing of conquering the tower only needs to be performed similar to the known game system.

Meanwhile, when the user wishes to simultaneously move a plurality of player objects, an operation of touching and selecting player objects one by one and moving the objects according to the method illustrated in FIG. 10 requires that all player objects need to be touched and selected one by one, and becomes complicated. Further, as described above, the moving speed varies per player object. Hence, even when the user wishes to move a plurality of player objects to the same point, a timing when each player object arrives at the specified point varies according to the moving speed of the player object.

Hence, as illustrated FIGS. 13(*a*) and 13(*b*), the game system can collectively select a plurality of player objects on the display screen, and can form a party of the selected player objects. FIG. 13(*a*) illustrates an example of an operation of collectively selecting a plurality of player objects O1 to O7. In addition, the operation illustrated in FIG. 13(*a*) is basically the same as the operation illustrated in FIG. 7. The processing unit 310 determines the coordinate of the first intermediate point M1 calculated from coordinates of the first two points P1 and P2 based on the coordinates of the first two points P1 and P2 simultaneously inputted to the touch panel display 100 by the user. Further, the processing unit 310 determines the coordinate M2 of the second intermediate point calculated from coordinates of the last two points P3 and P4 based on the coordinates of the last two points P3 and P4 detected immediately before the coordinates of the two points are dragged by the user and stop being simultaneously inputted. Furthermore, the processing unit 310 specifies a rectangular area on the display screen of the touch panel display 100 based on the coordinate of the first intermediate point M1 and the coordinate M2 of the second point. Still further, a plurality of displayed player objects O1 to O7 is selected such that at least part of the player objects are included in the specified rectangular area. The selected player objects O1 to O7 are stored in the temporary memory unit in association with player objects which form a party.

FIG. 13(*b*) illustrates an example where a plurality of selected player objects O1 to O7 forms a party. As illustrated in FIG. 13(*b*), a plurality of collectively selected player objects O1 to O7 gathers at one site and forms a party. Further, the processing unit 310 performs processing of moving the party formed by a user's operation to a point touched next. That is, the player objects O1 to O7 form the party and move in a massing state. In this case, the moving speed of each player object which forms the party is different from each other. Then, the processing unit 310 reads from the object table a numerical value of the moving speed of each object which forms a party, and calculates the party moving speed based on the read numerical value of the moving speed of each player object. For example, the processing unit 310 only needs to calculate the slowest moving speed (the lowest numerical value) among the moving speeds of player objects which form a party as the party moving speed. Further, the processing unit 310 may determine the average value of the moving speeds of a plurality of player objects which forms a party as a party moving speed. Furthermore, the processing unit 310 can also calculate the fastest moving speed (the highest numerical value) among the moving speeds of player objects which form a party as the party moving speed. The party of the player objects moves to the specified point at the moving speed matching the value of the party moving speed calculated by the processing unit 310. When a plurality of points is specified, the processing unit 310 moves the party of the player objects sequentially to each point according to the specified order. When the moving party of the player objects encounters an enemy object during movement or arrives at a tower, processing of playing a match with an enemy object or processing of conquering a tower only needs to be performed similar to a known game system.

A characteristic system of the game executed by the game apparatus according to the present invention has been mainly described above. A known game apparatus which has a card reader or a known game apparatus which has a touch panel display can be adequately applied to other game processings.

Industrial Applicability

The present invention can be suitably used in a game industry.

Reference Signs List
1 Object memory unit
2 Display unit
3 Coordinate input unit
4 Object selecting unit
5 Movement control unit
6 Area specifying unit
7 Coordinate memory unit
10 Memory unit
20 Input/output unit
30 Control unit

The invention claimed is:

1. A game apparatus comprising:
an object memory unit which stores information related to moving speeds at which a plurality of player objects move in game space;
a display unit which can display images of the plurality of player objects;
a coordinate input unit which receives an input of a coordinate of the display unit on a display screen;
an object selecting unit which selects one or more of the player objects among the player objects displayed on the display unit based on the coordinate inputted to the coordinate input unit; and
a movement control unit which performs control of moving one or more of the player objects selected by the object selecting unit in the game space, wherein each selected player object is movable at a different individual speed,
when the object selecting unit selects one player object, the movement control unit reads the information related to the moving speed of the one selected player object from the object memory unit, and performs control of moving the one selected player object based on the read information related to the moving speed; and
when the object selecting unit selects plurality of player objects on the other hand, the movement control unit reads the information related to the moving speeds of the plurality of selected player objects, determines a party moving speed for moving the plurality of selected player objects as a party based on the read information related to the plurality of moving speeds, and performs control of moving the plurality of selected player objects according to the party moving speed.

2. The game apparatus according to claim 1, wherein:
the object memory unit stores the information related to the moving speed of the player object as information which enables superiority and inferiority of a moving speed of each player object to be decided; and
the movement control unit determines the party moving speed as a most inferior moving speed among the information related to the plurality of moving speeds read from the object memory unit.

3. The game apparatus according to claim 1, wherein:
the object memory unit stores the information related to the moving speed of the player object as a numerical value; and
the movement control unit calculates an average value from numerical values of the plurality of moving speeds read from the object memory unit, and determines the calculated average value as the party moving speed.

4. The game apparatus according to claim 1, wherein:
the object memory unit stores values of influence forces of the player objects; and
when the object selecting unit selects the plurality of player objects,
the movement control unit reads the information related to the moving speeds of the plurality of selected player objects and the values of the influence forces from the object memory unit, and
determines information related to a moving speed of player object which comprises a highest influence force among the plurality of read influence forces as the party moving speed, and performs control of moving the plurality of selected player objects according to the party moving speed.

5. The game apparatus according to claim 1, further comprising
an area specifying unit which specifies an area on the display screen of the display unit based on the coordinate inputted to the coordinate input unit, wherein:
the area specifying unit
determines a coordinate of a first intermediate point calculated from coordinates of first two points based on the coordinates of the first two points simultaneously inputted to the coordinate input unit,
determines a coordinate of a second intermediate point calculated from coordinates of last two points based on the coordinates of the last two points detected immediately before coordinates of two points stop being simultaneously inputted, and
defines the area on the display screen of the display unit based on the coordinate of the first intermediate point and the coordinate of the second intermediate point; and
the object selecting unit
selects one or more of the player objects at least part of which is included in the area specified by the area specifying unit.

6. A non-transitory computer readable medium that stores an executable computer program causing a computer to function as:
an object memory which stores information related to moving speeds at which a plurality of player objects move in game space;
a display which can display images of the plurality of player objects;
a coordinate input which receives an input of a coordinate of the display on a display screen;

an object selector which selects one or more of the player objects among the player objects displayed on the display based on the coordinate inputted to the coordinate input; and a movement controller which performs control of moving one or more of the player objects selected by the object selector in the game space, wherein each selected player object is movable at a different individual speed, wherein:

when the object selector selects one player object, the movement controller reads the information related to the moving speed of the one selected player object from the object memory, and performs control of moving the one selected player object based on the read information related to the moving speed; and when the object selector selects the plurality of player objects on the other hand, the movement controller reads the information related to the moving speeds of the plurality of selected player objects, determines a party moving speed for moving the plurality of selected player objects as a party based on the read information related to the plurality of moving speeds, and performs control of moving the plurality of selected player objects according to the party moving speed.

7. A game apparatus comprising:
a touch panel display;
a card reader; and
a game body which advances a game by displaying information read by the card reader on the touch panel display, wherein:
the touch panel display comprises:
a display which can display images of a plurality of player objects in game space;
a touch screen which is overlaid in front of the display and through which a coordinate on a display screen of the display is inputted;
the card reader comprises:
a panel on which a card with a code comprising predetermined card information printed thereon is set; and
an image sensor which reads the code of the card set on the panel and detects the card information;
the game body comprises:
a game information memory unit which stores information related to the player objects in association with the card information, and stores information related to moving speeds at which the plurality of player objects moves in the game space;
an image processing unit which reads the information related to the player objects from the game information memory unit based on the card information detected by the image sensor of the card reader, and performs control of displaying the images of the read player objects on the display of the touch panel display; and
a game processing unit; and
the game processing unit
selects one or more of the player objects among the plurality of player objects displayed on the display based on coordinate information inputted to the touch screen, wherein each selected player object is movable at a different individual speed, when selecting one player object, reads the information related to the moving speed of the one selected player object from the game information memory unit, and performs control of moving the one selected player object based on the read information related to the moving speed, and when selecting plurality of player objects on the other hand, reads the information related to the moving speeds of the plurality of selected player objects from the game information memory unit, determines a party moving speed for moving the plurality of selected player objects as a party based on the read information related to the plurality of moving speeds, and performs control of moving the plurality of selected player objects according to the party moving speed.

8. The game apparatus according to claim 2, further comprising
an area specifying unit which specifies an area on the display screen of the display unit based on the coordinate inputted to the coordinate input unit, wherein:
the area specifying unit
determines a coordinate of a first intermediate point calculated from coordinates of first two points based on the coordinates of the first two points simultaneously inputted to the coordinate input unit,
determines a coordinate of a second intermediate point calculated from coordinates of last two points based on the coordinates of the last two points detected immediately before coordinates of two points stop being simultaneously inputted, and
defines the area on the display screen of the display unit based on the coordinate of the first intermediate point and the coordinate of the second intermediate point; and
the object selecting unit
selects one or more of the player objects at least part of which is included in the area specified by the area specifying unit.

9. The game apparatus according to claim 3, further comprising
an area specifying unit which specifies an area on the display screen of the display unit based on the coordinate inputted to the coordinate input unit, wherein:
the area specifying unit
determines a coordinate of a first intermediate point calculated from coordinates of first two points based on the coordinates of the first two points simultaneously inputted to the coordinate input unit,
determines a coordinate of a second intermediate point calculated from coordinates of last two points based on the coordinates of the last two points detected immediately before coordinates of two points stop being simultaneously inputted, and
defines the area on the display screen of the display unit based on the coordinate of the first intermediate point and the coordinate of the second intermediate point; and
the object selecting unit
selects one or more of the player objects at least part of which is included in the area specified by the area specifying unit.

* * * * *